United States Patent [19]

Garrison

[11] Patent Number: 4,686,961
[45] Date of Patent: Aug. 18, 1987

[54] INTEGRATED SOLAR THERMAL ENERGY COLLECTOR SYSTEM

[75] Inventor: John D. Garrison, 5607 Yerba Anita Dr., San Diego, Calif. 92115

[73] Assignee: John D. Garrison, San Diego, Calif.

[21] Appl. No.: 800,658

[22] Filed: Nov. 22, 1985

Related U.S. Application Data

[63] Continuation-in-part of Ser. No. 794,010, Nov. 1, 1985, abandoned, and Ser. No. 702,401, Feb. 15, 1985, abandoned.

[51] Int. Cl.$^4$ ................................................. F24J 3/02
[52] U.S. Cl. .................................... 126/433; 126/443; 165/104.21
[58] Field of Search ............... 126/433, 434, 443, 448, 126/438, 450; 165/104.21, 104.26

[56] References Cited

U.S. PATENT DOCUMENTS

| | | | |
|---|---|---|---|
| 4,119,085 | 10/1978 | Knowles et al. | 126/433 |
| 4,217,882 | 8/1980 | Feldman | 126/433 |
| 4,240,405 | 12/1980 | French | 126/433 |
| 4,306,543 | 12/1981 | Doevenspeck et al. | 126/433 |
| 4,423,718 | 1/1984 | Garrison | 126/438 |
| 4,474,170 | 10/1984 | McConnell et al. | 126/433 |
| 4,505,261 | 3/1985 | Hunter | 126/433 |

FOREIGN PATENT DOCUMENTS

| | | | |
|---|---|---|---|
| 0055033 | 5/1977 | Japan | 126/433 |
| 0148353 | 9/1983 | Japan | 126/433 |
| 0173343 | 10/1983 | Japan | 126/433 |

*Primary Examiner*—Margaret A. Focarino

[57] ABSTRACT

The solar thermal collector system of this invention consists of an evacuated glass solar collector, a heat storage system, and a tubular heat pipe system to transfer heat from the evacuated glass solar collector directly to the heat source system. The evacuated glass solar collector has substantially parallel linear concentrating troughs with mirror surface in vacuum which concentrate, approximately ideally, solar radiation onto internal glass tubes coated with selective absorber. The selective absorber converts the concentrated solar radiation into heat. The tubular heat pipe system consists of a plurality heat pipes. The evaporating end of each tubular heat pipe receives heat from solar radiatiion and transfers it directly to the condensing end of the heat pipes. The condensing end of each metal heat pipe is in good thermal contact with the heat storage tank of the heat storage system. The heat storage system has means of limiting the maximum temperature of the stored heat and means of removal of the heat for use. The solar thermal collector system of this invention forms a simple, compact, integrated unit of low cost and high efficiency which can be combined with other units to form an array of larger area.

18 Claims, 24 Drawing Figures

INTEGRATED SOLAR THERMAL ENERGY COLLECTOR SYSTEM

This is a continuation-in-part of application with Ser. No. 702,401, filed Feb. 15, 1985, now abandoned, and application with Ser. No. 794,010, filed Nov. 1, 1985, abandoned.

BACKGROUND OF THE INVENTION

1. Field of the Invention

The invention described herein, one of a class of collector systems called a solar thermal collector system, in which radiation from the sun is converted into heat at an absorbing surface, from which this heat is collected and utilized. Three particular important aspects of the invention are approximately ideal concentration, selective absorption, and the use of a heat pipe system for transfer of the solar energy collected as heat directly into a heat storage system. In combination with a high vacuum, utilization of these three features allow the development of an integrated solar thermal collector system which can operate inexpensively and efficiently at temperatures approaching 300° C. without tracking the sun, that is, as a fixed solar collector system.

2. Description of the Prior Art

Selective Absorption: A solar selective absorber for this purpose is defined as an absorber which has high absorptance for solar radiation and low absorptance, and thus low emittance, for infrared radiation of wavelengths emitted at the operating temperature of the solar collector. Solar selective absorbers with optical properties similar to that required here are discussed, for example, by A. Meinel and M. Meinel, *Applied Solar Energy* (Addison-Wesley Publ. Co., Reading, Mass., 1976), Chap. 9. The optical properties of the selective absorber are extremely important in obtaining high efficiency for this type of collector.

Ideal Concentration: Ideal concentration provides maximum concentration for a given angle of acceptance of solar radiation. The kind of ideal concentration considered here is cylindrical concentration onto a circular absorbing tube. The concentrating mirror surface runs the length of the absorbing tube and forms a trough. The concentration ratio is defined as the ratio of the width of the concentrating trough at the top to the circumference of the absorbing tube.

A number of patents are concerned with ideal concentration. R. Winston, U.S. Pat. No. 4,002,499, is concerned with mirror reflector shapes for cyclindrical or trough-like ideal concentration onto circular and oval cross section tubes and onto a vertical fin. A. Rabi and R. Winston, U.S. Pat. No. 4,130,107, also confine their discussion almost entirely to cylindrical concentrating mirror surfaces. In this case, they discuss a modification of Winston's patent which reduces the amount of grazing radiation on the absorbing surface, for radiation within certain pre-defined acceptance angles. W. Wyatt, U.S. Pat. No. 4,129,115, concerns himself with approximately ideal concentration suitable for a flat strip absorber, following an earlier patent of R. Winston, U.S. Pat. No. 3,923,381. He utilizes the desirable compromise of truncating the ideal concentration to reduce concentrating mirror area and thus cost. R. Lambert, U.S. Pat. No. 4,246,891, modifies the ideal concentration of Winston to be suitable for a circular cross section absorbing tube with concentric transparent vacuum enclosure.

With circular cross section absorbing tube, ideal concentration leads to a cusp in the concentrating trough which is in contact with the bottom of the absorbing tube. In order to avoid heat conduction losses from the absorbing tube to the concentrating trough, a gap is introduced between the absorbing tube and the cusp. This leads to a loss of solar radiation, called gap loss. R. Winston and W. McIntire, separately, discuss a method of putting grooves below the absorbing tube to reduce gap loss, at the expense of reduced concentration. These discussions are in Proceedings of the 1980 Annual Meeting of the American Section of the International Solar Energy Society and the journal Solar Energy, Vol. 25, pp. 215–220 (1980). Grooves are less significant for the invention disclosed here, as discussed in J. Garrison, U.S. Pat. No. 4,423,718.

A solar collector system using ideal or approximately ideal concentration with a sufficiently large acceptance angle can be oriented to receive solar radiation at all times of the year, during the daily desired hours of collection, without tracking the sun or in any way adjusting the orientation of the collector. This is an important method of greatly reducing the cost and increasing the reliability of a collector system without appreciably reducing the collector system performance.

Alternatively, the acceptance angle can be reduced to yield higher concentration, and the tilt of the collector can be adjusted a few times over the year to face the sun in each season. A rigidly fixed collector, using a selective absorber with superior optical properties, is preferred.

One patent where a collector design is indicated using approximately ideal concentration is that of A. Livermore, U.S. Pat. No. 4,134,392. He has discovered a cartesian curve describing his mirror concentrating surface which approximates the ideal concentration of Winston. He describes a solar collector involving an array of concentrating troughs with this cartesian curve shape, and with transparent tubes carrying an absorptive fluid placed in the bottom of these troughs to collect the solar energy as heat. Another case is that of D. Hervey, U.S. Pat. No. 3,321,012, who precedes Winston in the use of almost ideal concentration onto an elongated fin-like absorbing tube for the special case of a 180° acceptance angle. The early work of F. Trombe, in U.S. Pat. No. 3,310,102 concerning infrared radiators, includes two reflector shapes which consist of involutes joining smoothly to plane reflectors. These reflector shapes are very similar to Winston, above. Another early reflector of this type is the Trombe-Meinel cusp, discussed in Meinel and Meinel, above, p. 204. It involves ideal concentration onto a circular cross section tube for the special case of an acceptance angle of 180°.

Vacuum Collectors Without Ideal Concentration: Numerous collector designs use glass vacuum envelopes to insulate the absorbing surface, but do not use ideal concentration or approximately ideal concentration. A few examples include Abbot, U.S. Pat. No. 1,801,710; Abbot, U.S. Pat. No. 1,855,815; Emmet, U.S. Pat. No. 1,880,938; Abbot, U.S. Pat. No. 2,133,649; Godel, et al, U.S. Pat. No. 3,227,153; Mather, U.S. Pat. No. 4,002,160; Pei, U.S. Pat. No. 4,084,576; Doughty and Goodwin, U.S. Pat. No. 4,142,511; and Sims, U.S. Pat. No. 4,308,857.

Heat Pipes for Thermal Control: B. S. Larkin, in *Heat Transfer* 1982, Vol. 6, Proceedings of the Seventh International Heat Transfer Conference, Muenchen, Federal Republic of Germany, treats the case where a heat pipe can be designed to transfer no heat above a given temperature by adjusting the quantity of working fluid in the heat pipe. This kind of heat pipe can limit the peak temperature of a storage reservoir receiving heat from this heat pipe.

Many sources treat the subject of variable conductance heat pipes where an inert gas is inserted in a heat pipe with the working fluid. A variable conductance heat pipe can be used to regulate the temperature of a heat source, such as a storage system. See for example, P. Dunn and D. Reay, *Heat Pipes* (Pergamon Press, New York, 1976) pp. 199–231.

Heat Storage Systems: Storage systems are discussed in J. Duffie and W. Beckman, *Solar Energy Thermal Processes* (John Wiley and Sons, New York, N.Y., 1974) Chap. 9 and D. Rapp, i Solar Energy (Prentice-Hall, Englewood Cliffs, N.J., 1981) Chap. 13, and their references, for example.

Vacuum Collectors Using Heat Pipes: J. Ribot and R. McConnell in Journal of Solar Energy Engineering, Vol. 105, pp. 440–445 (November 1983) (See also U.S. Pat. No. 4,474,170) describe an evacuated solar thermal energy collector using a selective absorber coating on a glass walled heat pipe in vacuum for collection and transfer of the collected heat to an external manifolding. A. Slaats, in U.S. Pat. No. 4,335,709, describes an evacuated collector tube using an absorbing metal heat pipe. The collector tube design is somewhat similar to that of Ribot and McConnell. J. de Grijs and H. Bloem, in U.S. Pat. No. 4,356,811, G. W. Knowles, U.S. Pat. No. 4,119,085, H. van der Aa, U.S. Pat. No. 4,416,261, F. Sabet, U.S. Pat. No. 4,311,131, and W. Kroontje and G. Kuus, U.S. Pat. No. 4,455,998 describe an evacuated solar collector tube using a metal heat pipe with solar heat absorber plate. None of the above collecters using heat pipes use ideal or approximately ideal concentration in their collector tubes. Ortabasi and Buehl, in Proceedings of the 1977 Annual Meeting of the American Section of the International Solar Energy Society and later in the journal Solar Energy, Vol. 24, pp.477–489 (1980), have introduced a glass evacuated collector tube with internal, approximately ideal reflector, which uses a metal heat pipe to remove the solar heat from the collector tube.

Collector Systems with Passive Heat Transfer Directly from Collectors to Storage Medium: One of the collector systems similar in appearance, but rather different from, the invention presented here is the commercially produced Solahart flat plate system (Solahart of California Corporation). This system has the storage tank at the upper end and above the collector, and uses thermal convection to cause closed circulation of heated fluid from the collector to the storage tank, and the return of cooler fluid into the lower end of the collector. The system of K. T. Feldman, U.S. Pat. No. 4,217,882, uses an absorbing heat pipe to receive solar radiation focussed or concentrated by a reflector, and transmits heat obtained by this radiation to a storage reservoir. Other systems include those of R. French, U.S. Pat. No. 4,240,405; B. Hunter, U.S. Pat. No. 4,505,261; K. K. Sharp and E. Okamoto, Japanese Pat. No. 55,033; and D. Matsushita and M. Masaharu, Japanese Pat. No. 195,744.

Vacuum Collectors Using Approximately Ideal Concentration: The collector designs of L. Dorbeck, U.S. Pat. No. 4,198,955, use the features of vacuum, approximately ideal concentration, and selective absorption, which are required of a solar collector which is to be highly efficient at elevated temperatures, while still being low in cost. The tubular collectors described by Dorbeck are similar to those proposed by J. Garrison at about the same time in Proceedings of the 1977 Annual Meeting of the American Section of the International Solar Energy Society, and more recently reported in the journal Solar Energy, Vol. 23, pp. 93–102, 103–109 (1979). The solar collector panel design of J. Garrison, U.S. Pat. No. 4,423,718 is somewhat similar to the panel of Dorbeck. This panel of Garrison carries the concept of functional integration an important design improvement beyond Dorbeck, integrating the manifolding inside the panel. The choice of an all glass vacuum envelope for the Garrison panel is also important by simplifying fabrication and reducing materials costs. The designs of Garrison, Dorbeck, and Ortabasi and Buehl comprise those collectors closest in concept to the design of the solar collectors in the solar thermal collector system of this application.

Other collectors using approximately ideal concentration, vacuum and selective absorption include: General Electric Company collectors TC 100 and TC 120 (following Lambert, above); and Energy Design Corporation (Memphis, Tenn.) collectors XE-300 (similar to the Argonne National Laboratory design described without vacuum by A. Rabl, et al in Solar Energy, Vol. 25, pp. 335–351 (1980)) and the more recent HP-250.

Prior Art Deficiencies: As discussed, numerous designs for solar thermal collector systems have appeared over the years in patents and in the published literature. All of these designs apparently function properly, though some are more highly preferred by virtue of lower cost, greater durability, and/or higher efficiency. A major problem has been the cost of this energy relative to the cost of energy from other sources. Another problem has been the inability of most of these collectors to operate at sufficiently elevated temperatures, or under conditions of low ambient temperatures or low solar radiation. Practically all of these designs have not reached the market place, and those that have, generally have been unable to compete in price with other sources of energy.

Further, the prior art solar collectors are inefficient and/or high cost relative to the solar thermal collector system design presented here, either by lacking certain design features which are important for efficient solar energy collection, or by lacking design or production features needed to achieve low cost, or for both of these reasons. The important features required to obtain high efficiency and low cost are selective absorption, vacuum, approximately ideal concentration, the use of low cost materials and processes for fabrication, and functional integrity, not just of the collector, but of the combined collector, storage and energy utilization system. Functional integrity here means using one structural element to serve more than one function, thus simplifying design and generally reducing cost.

In the prior art, the system of K. T. Feldman uses a metal heat pipe to transfer the solar heat to a storage reservoir, in a manner similar to that of the invention of this application. This solar heat is obtained by an adjustable concentrator concentrating solar radiation on this heat pipe. Although there can be vacuum, approximately ideal concentration, and selective absorption, this collector system is very different from the collector of this invention, primarily because it is not functionally integrated and also uses different materials. This is also true for the collector of Sharp and Eiki.

The collector tube of Ortabasi and Buehl uses a metal heat pipe to transfer the collected solar energy outside the collector tube, where this energy is removed by passing a heat transfer fluid past this outer end of the heat pipe. This collector tube uses a glass-to-metal seal, which is more expensive. Arrays of these tubes require manifolding and piping with insulation to transfer the collected heat to storage, also at added cost and lower efficiency. Further, the approximately ideal concentration used in this collector tube is separate from the vacuum envelope. Metal concentrators formed this way have lower reflectivity and higher cost than the silvered glass concentrator used with the tubes of Garrison and Dorbeck, and the panel of Garrison, where the vacuum envelope function and the concentration function are integrated.

The Collector tubes of Garrison and Dorbeck have integrated the concentration function and the vacuum envelope function, but require insulated external manifolding and piping to collect the heat from an array of these tubes and transfer this heat to storage. In addition, these tubes generally require either glass-to-metal seals, graded seals, or more expensive low expansion glass, at higher cost.

The panel of Garrison integrates the manifolding function, the concentration function, and the vacuum envelope function, but requires a pump to pass fluid through an array of these panels. Further, these panels require expensive glass-to-metal seals or graded seals, though many fewer for an array than the tubes of Dorbeck, Garrison, or Ortabasi and Buehl.

The above collector tubes of Dorbeck, Garrison, and Ortabasi and Buehl, and the panels of Dorbeck and of Garrison utilize vacuum, approximately ideal concentration, selective absorption and varying degrees of functional integrity. They also attempt to use low cost materials and processes to a varying degree. However, none of them take the important added step of carrying the functional integration and the design integration to a more complete solar thermal collector system. This added step yields very significant savings in the cost, ease of fabrication, and reliability of operation of the invention of this application, and it also contributes to a higher energy collection efficiency of this invention.

Although the tubes and panels of Garrison, Dorbeck, and Ortabasi and Buehl, above, are preferred over earlier collectors, there are a number of decisions to be made and difficulties associated with these decisions which have not been resolved previously. The main decisions are: (1) whether to use glass or metal for the absorber tube, and which glass or metal, (2) whether to use a heat pipe or fluid flow to remove the solar heat, (3) with a heat pipe, what fluid and geometry to use, and with fluid flow, what pipe flow geometry and heat transfer fluid should be used, and (4) whether to use more expensive, low thermal expansion glass or less expensive, high thermal expansion glass.

Some of the difficulties associated with the above decisions are as follows: The decision to use a tube collector with a metal absorbing tube leads to the requirement of glass-to-metal seals which are expensive and make tube fabrication more difficult. Similarly, a glass absorbing tube must apparently be borosilicate glass or other, more expensive, low expansion glass to avoid cracking of the glass when cool fluid is pumped through hot glass or vice versa at start up. The vacuum envelope could be high thermal expansion soda lime glass to reduce the cost of the vacuum tube. This then requires an expensive graded seal between the absorbing tube glass and the vacuum envelope glass. If straight flow through the tube is desired, then two glass-to-metal seals or graded seals and a bellows or similar device of added cost are required to accommodate for the thermal expansion of the absorbing tube. If a counter flow design is used, either the ideal concentration is compromised, or the ease of connecting the manifold is compromised. Collector tubes have been connected together in an array using an external manifolding, which has higher cost, higher losses, and lower energy collection than the panel of Garrison. Series fluid flow through an array either requires higher pumping pressure, or, if lower pumping pressure is used, this leads to higher radiation losses. Parallel flow requires careful design of the flow network to allow flushing out the bubbles in the network, and can have greater difficulty with drain-down, which is commonly used to avoid problems with fluid freezing. Drain-down can be avoided by using a fluid other than water, which does not freeze at the lower ambient temperatures, but these fluids are usually considerably more expensive and poorer heat transfer fluids than water. If drain-down is not practiced, then, if the pump shuts down during the daytime, the high stagnation temperatures achieved by the system can lead to excessively high pressures, perhaps breakdown of the fluid, and perhaps a fire. The few suitable fluids known to us which appear not to have these problems are quite expensive. Most heat transfer fluids other than water are polluting, if lost from the system, and are usually flammable.

Heat pipes used with high efficiency solar collector tubes or panels having vacuum, approximately ideal concentration, and selective absorption can experience high pressures at the stagnation temperatures possible for this type of collector. This can make the use of heat pipes less desirable, unless the maximum temperature is controlled, as in the invention of this application.

This patent application is a continuation-in-part of patent application with Ser. No. 702,401 and patent application with Ser. No. 794,010. Each of these earlier applications contain different embodiments of what is basically the same invention. There is another additional embodiment, which will also be included in the present application. There should be only one patent application for the different embodiments of this invention, with one generic claim and separate claims for each of the different embodiments.

SUMMARY OF THE INVENTION

The solar thermal collector system of this invention consists of an evacuated glass solar collector having approximately ideal concentration and selective absorption, a heat storage system, and a tubular heat pipe system.

The evacuated glass solar collector has a glass vacuum envelope whose upper portion also serves as window to pass solar radiation into the vacuum. The evacuated glass solar collector has a multiplicity of substantially parallel linear troughs in the vacuum, which are mirror coated and shaped so as to concentrate solar radiation. Also in the vacuum are a corresponding multiplicity of substantially parallel linear glass absorbing tubes, one absorbing tube positioned in each trough so as the receive the concentrated solar radiation. Each glass absorbing tube is coated substantially over its surface with a selective absorber of solar radiation. Each glass absorbing tube runs substantially the length of the corresponding trough. One end of each of the glass absorbing tubes is closed inside the vacuum. The other end allows for heat pipe removal of the collected heat by means depending upon the particular embodiment of this invention.

The tubular heat pipe system serves to transfer the heat obtained from concentrated solar radiation by each glass absorbing tube directly to the heat storage system in a highly efficient manner.

The principal part of the heat storage system is a covered, insulated heat storage tank. The heat storage tank contains a heat storage medium, such as water, and can include a phase change material to increase the density of the stored energy. The heat storage system includes a means of removal of the stored heat energy for utilization. The solar thermal collector system also has means of limiting the maximum heat storage tank temperature.

The solar thermal collector system of this invention forms a simple, compact, integrated unit of low cost and high efficiency which can be combined with other units to form an array of larger collecting area.

The various glass parts of the evacuated glass solar collector are formed from the same glass or glass with substantially the same thermal expansion. The same glass or glass with substantially the same thermal expansion will be called *like glass*. Like glass allows much easier and much lower cost sealing of the various parts of the evacuated glass solar collector. In addition, the use of low cost glass is important, since low cost glass greatly reduces collector expense. Low cost, high thermal expansion glass can only be used with a solar thermal collector system, such as this, which avoids shocking the glass with a hot or cold circulating heat transfer fluid.

The heat pipes of the tubular heat pipe system can be heat pipes without gas loading or with gas loading (variable conductance heat pipes), whose operation can be such as to limit the maximum temperature reached by the heat storage system. The heat pipe system is arranged by its slope and wick structure or lack of a wick to operate as a thermosyphon with high conductance and high heat flow into the heat storage system at times of solar energy collection, but very low conductance and very low flow of heat from the heat storage system to the evacuated glass solar collector at times of no solar energy collection (a diode type operation).

The inventive design of the solar thermal collector system of this invention eliminates the need for expensive glass to metal seals, graded seals, bellows, and low thermal expansion glass, greatly reducing cost, without comprising, and actually improving, the durability and efficient operation of this solar thermal collector system. Heat transfer directly to the heat storage system using the tubular heat pipe system eliminates the need for an expensive circulating pump, insulated manifolding, and insulated heat transfer fluid circulating lines, and is expected to have lower heat loss than prior solar thermal collector systems. There are no problems of boiling, freezing, drain-down, bubbles in the heat transfer lines, and less chance of fire. Heat transfer is purely passive; there are no moving mechanical parts.

In the first embodiment of this invention, the evacuated glass solar collector comprises one or more glass solar collector panels. Each glass solar collector panel comprises essentially just three parts: An upper glass sheet which serves as upper portion of the glass vacuum envelope and window to pass solar radiation into the vacuum; a lower glass sheet structured into a plurality of substantially parallel linear troughs, shaped and mirrored to concentrate solar radiation approximately ideally in the vacuum, which also serves as the lower portion of the glass vacuum envelope; and a plurality of substantially parallel linear glass absorbing tubes, each tube positioned in vacuum in corresponding trough so as to receive the concentrated solar radiation. The glass absorbing tubes have one end closed in the vacuum and the other end with opening external to the vacuum. This open end is sealed to the glass vacuum envelope. The heat pipe system consists of a multiplicity of metal heat pipes, a corresponding plurality of these heat pipes for each glass solar collector panel. Each metal heat pipe has a substantially linear evaporator section inserted in the opening at one end of the corresponding glass absorbing tube so as to substantially fill this glass absorbing tube. Each metal heat pipe has an adiabatic section which proceeds from the evaporator section to exit from the glass absorbing tube through the opening at one end, and proceeds from the opening to the condenser section. The condenser section is in good thermal contact with the heat storage tank and heat storage medium of the heat storage system so as to provide efficient transfer of heat from the glass absorbing tube to the heat storage system.

In the second embodiment of this invention, the evacuated glass solar collector is also one or more glass solar collector panels. However, this embodiment differs from the first embodiment by having the heat pipe system consist of a multiplicity of glass tubular heat pipes, with the glass absorbing tubes of the one or more glass solar collector panels serving as the multiplicity of evaporator sections of the glass tubular heat pipes. The adiabatic sections of the glass tubular heat pipes proceeding from the evaporator sections to exit from the glass vacuum envelope and sealed thereto. The adiabatic sections proceeding from exit to the condenser section. The condenser section is in good thermal contact with the heat storage tank and heat storage medium of the heat storage system so as to provide efficient transfer of hear from the glass absorbing tube to the heat storage system.

A third embodiment of this invention is a variation of the second embodiment, in which there is only one glass heat pipe for each glass solar collector panel. Each glass heat pipe has a plurality of substantially parallel linear glass absorbing tubes, positioned in corresponding troughs to receive the concentrated solar radiation. One end of each of the plurality of absorbing tubes is closed and inside the vacuum, while the other ends are joined to a cross manifold absorbing tube. The plurality of substantially parallel, linear glass absorbing tubes and cross manifold absorbing tube substantially form the evaporator section of the glass tubular heat pipe. The adiabatic section of the glass heat pipe proceeds from the evaporator section substantially at the cross manifold absorbing tube to exit from the glass solar collector panel with vacuum seal thereto. The adiabatic section proceeding thence from the vacuum seal directly to the condenser section. The condenser section is in good thermal contact with the heat storage tank and heat storage medium, so as to provide efficient heat transfer from the glass absorbing tubes and cross manifold absorbing tube to the heat storage system.

In a fourth embodiment, the evacuated glass solar collector is a multiplicity of substantially parallel linear evacuated glass solar collector tubes. The upper part of each glass solar collector tube serves as a window to admit solar radiation. The lower part of each glass solar collector tube is a substantially linear trough, shaped and mirrored internally so as to concentrate, approximately ideally, the solar radiation admitted through the upper part. Each glass solar collector tube has within its vacuum a substantially parallel linear glass absorbing tube positioned in the substantially linear trough so as to receive the concentrated solar radiation. The opening at one end of each glass absorbing tube is external to the vacuum at one end of the corresponding glass solar collector tube with end sealed thereto. In this embodiment, the tubular heat pipe system consists of a multiplicity of metal heat pipes, in the manner of the first embodiment. The evaporator section of each metal heat pipe is inserted into the opening of one of the corresponding multiplicity of glass absorbing tubes so as substantially to fill each glass absorbing tube. The adiabatic section of each metal heat pipe proceeds directly from the evaporator section to the condenser section. The condenser section is in good thermal contact with the heat storage tank and heat storage medium of the heat storage system so as to provide efficient transfer of heat from the glass absorbing tube to the heat storage system.

In a fifth embodiment, the evacuated glass solar collector consists of a multiplicity of glass solar collector tubes, as in the fourth embodiment. However, in this case, each glass absorbing tube also serves as the evaporator section of a glass heat pipe, as in the second embodiment. The adiabatic section of each glass heat pipe proceeds from the evaporator section to exit from the glass solar collector tube at one end, and is sealed thereto. The adiabatic section of each glass heat pipe proceeds directly from the seal to the condenser section. The condenser section is in good thermal contact with the heat storage tank and heat storage medium of the heat storage system so as to provide efficient transfer of heat from the glass absorbing tube to the heat storage system.

In a sixth embodiment, the evacuated glass solar collector also comprises a multiplicity of glass solar collector tubes, as in fourth and fifth embodiments. However, in this case the vacuum envelope of the glass solar collector tubes is circular in cross section, and concentric with the glass absorbing tube. The lower part of the vacuum envelope is not shaped and mirrored to concentrate solar radiation in the vacuum. Instead, a metal foil mirror is shaped and inserted into the circular vacuum envelope so as to concentrate, approximately ideally, solar radiation onto the centrally located, glass absorbing tube. The opening in one end of the glass absorbing tube is outside the vacuum, with that end sealed to the glass vacuum envelope, as for the first and fourth embodiments. A metal heat pipe provides efficient transfer of heat from the glass absorbing tube to the heat storage system, as for the first and fourth embodiments.

Finally, for the seventh embodiment, there is multiplicity of substantially linear evacuated glass solar collector tubes, as in the sixth embodiment. Thus, these tubes too have separate internal metal foil mirror with concentrates, approximately ideally, solar radiation onto an internal substantially parallel linear glass absorbing tube positioned to receive this concentrated solar radiation. The circular cross section glass vacuum envelope tube is concentric with the glass absorbing tube, with upper part which serves as a window to admit solar radiation into the vacuum. The difference between this and the previous embodiment is the use of glass, rather than metal heat pipes, for the heat pipe system, as in the second and fifth embodiment. Each glass absorbing tube also serves as the evaporator section of corresponding glass tubular heat pipe.

There are a number of combinations of four separate choices which comprise these embodiments. There is the choice of a tubular heat pipe system comprising a multiplicity of metal heat pipes which are separate from the evacuated glass solar collector, or a tubular heat pipe system comprising a multiplicity of glass heat pipes which are part of the evacuated glass solar collector. There is the choice of one or more glass solar collector panels or a multiplicity of glass solar collector tubes for the evacuated glass solar collector. There is a choice for the glass solar collector tubes of having the lower part of the glass vacuum envelope shaped into a concentration trough or having the glass vacuum envelope circular and concentric with the glass absorbing tube and having a separate metal foil mirror. Finally, there is the choice for the panels with tubular glass heat pipes to have a plurality of separate glass tubular heat pipes with exits from each panel or to have one glass tubular heat pipe for each panel with a plurality of glass absorbing tubes joined to a cross manifold tube which together serve substantially as the evaporator section of the glass tubular heat pipe. The embodiments which would use separate foil mirrors with each panel or would use a single separate metal heat pipe with each panel are not considered because they appear less desirable. The various other combinations of these choices form the other seven embodiments discussed above.

The sixth and seventh embodiments using glass solar collector tubes with separate metal foil mirrors are only of interest in the near term because of their lower capital cost in starting production.

Since both electricity and heat are commonly needed at the same solar energy collection site, the use of a selective absorber which also serves as a photovoltaic surface for the generation of electricity, may prove highly attractive for use with the evacuated glass solar collector of this invention.

The solar thermal collector system of this application is unique in its choice of features for its design which optimize its performance while minimizing its cost. The unique simplicity of its design and the judicious selection of materials and fabrication processes lead to low cost. The choice of design features which minimize heat loss and maximize solar energy collection lead to a highly efficient solar thermal collector system which can operate from near ambient temperatures up to temperatures approaching 300° C., depending upon simple adjustments in its design. Further, the integration of the evacuated glass solar collector, tubular metal heat pipe system, and heat storage system into one compact unit with no moving mechanical parts is very important, since this leads to much lower collector cost, and more efficient, reliable operation. This integrated solar thermal collector system eliminates many problems associated with a system which uses pump circulation of a heat transfer fluid.

There exists a continuing need for a low cost, highly efficient solar thermal collector system, which is not as well satisfied by prior art thermal collector system designs. Further, there exists a continuing need for a low cost, highly efficient solar thermal collector system which can provide trouble free operation at temperatures well above ambient. In addition, there is a need for a solar thermal collector system which is a simple, low cost, highly efficient unit of moderate area and which can be assembled to form compact, large area arrays without the use of manifolding or piping. There is also a need for a highly efficient low cost solar collector system which can generate both electricity and heat energy.

Accordingly, it is an object of this invention to provide thermal energy by the conversion of solar radiation into heat in a highly efficient and low cost manner. Further, it is an object of this invention to make possible obtaining this thermal energy at temperatures which can approach approximately 300° C., without tracking the sun. In addition, it is an object of this invention to provide a solar thermal collector system, which operates passively. It is also an object of this invention to provide efficient, low cost solar energy collecting and heat storage units of moderate size, which can be joined simply to other units to form an array of larger solar energy collecting area without manifolding. It is an object of this invention to have a solar collector which can generate electricity and heat at the same time. Finally, it is an object of this invention to provide a solar thermal collector system which also can serve as part of the walls or roof of a structure, provide protection from the elements and serve as an energy shield.

The solar thermal collector system of this invention resolves many of the difficulties associated with the prior art solar thermal collector systems, leading to higher efficiency and lower cost than prior art solar thermal collector systems. It is the very innovative integration of concepts used in the prior art into a simplified solar thermal collector system of greatly improved efficiency, lower cost, more reliable performance and easier fabrication which form the essence of this invention. Although the problems and deficiencies of prior art solar thermal collector systems have been known for many years and many efforts have been made to resolve these problems, there has been no system proposed which solves so many of these problems so uniquely and in so satisfactory a manner as the invention disclosed here.

BRIEF DESCRIPTION OF THE DRAWINGS

The following is a brief description of the accompanying drawings.

DESCRIPTION OF THE PREFERRED EMBODIMENTS

The invention of this application concerns an integrated solar thermal collector system consisting of just three parts: an evacuated glass solar collector, a heat storage system, and a tubular heat pipe system. The design of these parts must be such to allow their integration to form the solar thermal collector system of this invention.

Figure 1:
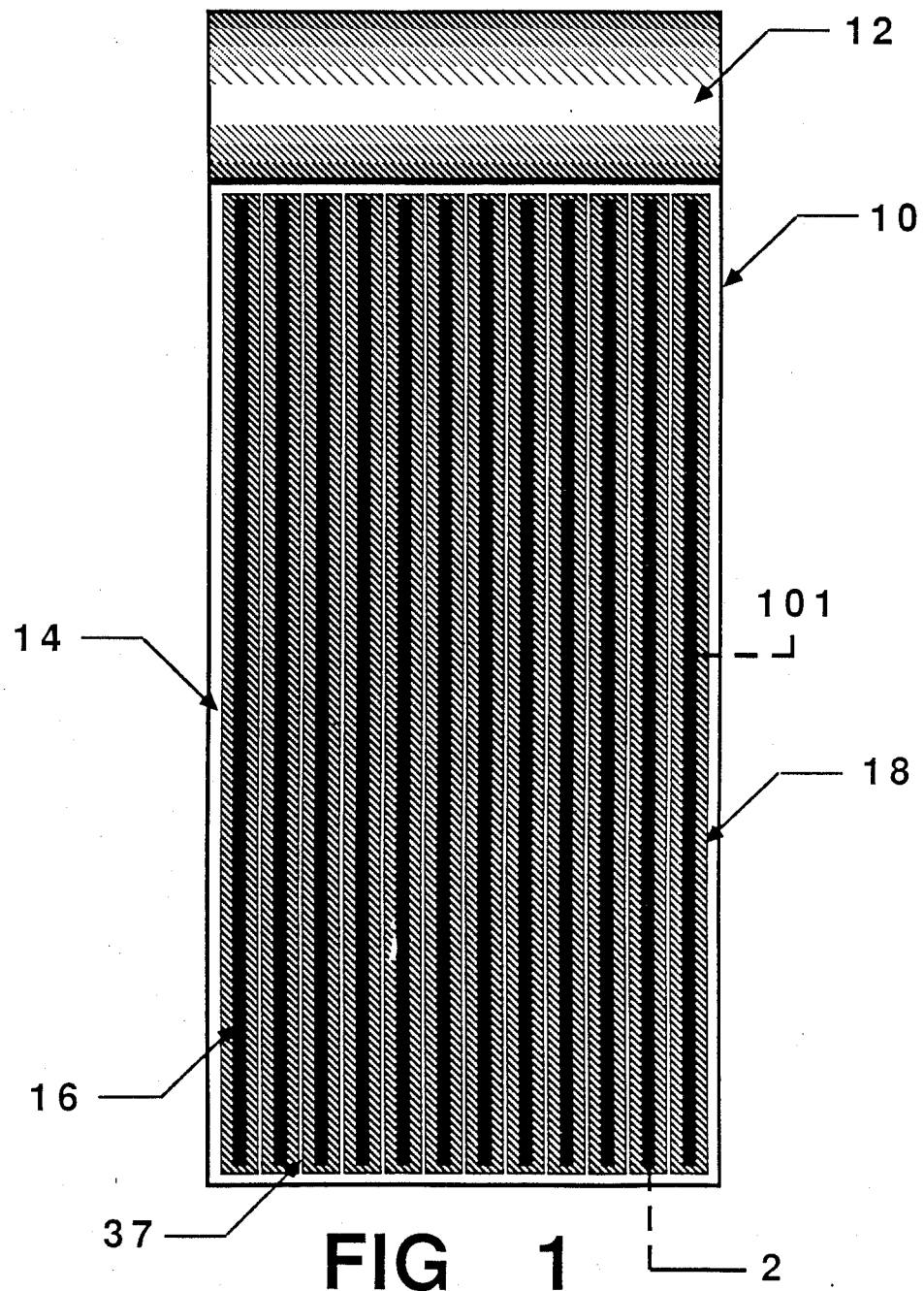
FIG. 1 is a top view of the embodiment of the solar thermal collector system of this invention which uses one or more evacuated glass solar collector panels for the evacuated glass solar collector, with a multiplicity of substantially parallel linear glass absorbing tubes for the absorption of concentrated solar radiation, and with a multiplicity of tubular metal heat pipes for the heat pipe system.

FIG. 1 shows a top view of one embodiment of the solar thermal collector system in which one glass solar collector panel 10 is used for the evacuated glass solar collector. In FIG. 1, a plurality of glass absorbing tubes 16 are positioned separately in a plurality of substantially parallel linear concentrating troughs 18 to receive the solar radiation concentrated by these concentrating troughs 18 and are coated with selective absorber. A frame 14 shown around the edges of the glass solar collector panel 10 can be used, if one wishes, to protect the glass edges of panel 10. It can be made so as to allow joining panel 10 to other panels 10 with moisture proof seal. A plurality of supporting ridges 37 between the concentrating toughs 18 are also indicated. Also shown in FIG. 1 is an insulated heat storage system 12. A means of removing the stored heat for utilization is omitted from all figures, since this in not relevant to the invention.

Figure 2:
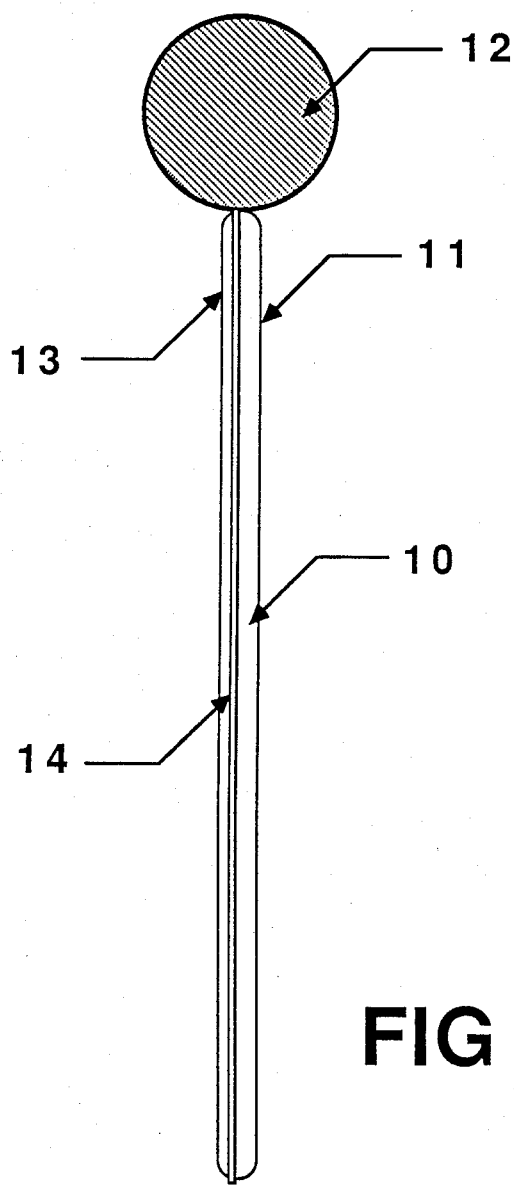
FIG. 2 is a side view of the solar thermal collector system of FIG. 1.

FIG. 2 shows a side view of the solar thermal collector system of FIG. 1. The glass solar collector 10 is formed by joining a shaped upper glass sheet 13 to a shaped lower glass sheet 11. The ridges 37 support the upper glass sheet 13 and lower glass sheet 11 at their contact to provide sufficient strength for evacuation of the panel 10. The upper glass sheet 13 serves as the top of the vacuum envelope and window to pass solar radiation into the vacuum. The lower glass sheet 11 serves as the bottom of the vacuum envelope, and is shaped into the series of substantially parellel mirrored concentrating troughs 18 and ridges 37. These troughs 18 serve to concentrate solar radiation onto the internal glass absorbing tubes 16. Additional details of these concentrating troughs 18, and of a similar panel, which are not essential to this application, are discussed in J. Garrison, U.S. Pat. No. 4,423,718. Although the heat storage system 12 is shown to be circular in cross section in this figure and later figures, other shapes, such as oval or rectangular are also possible.

Figure 3:
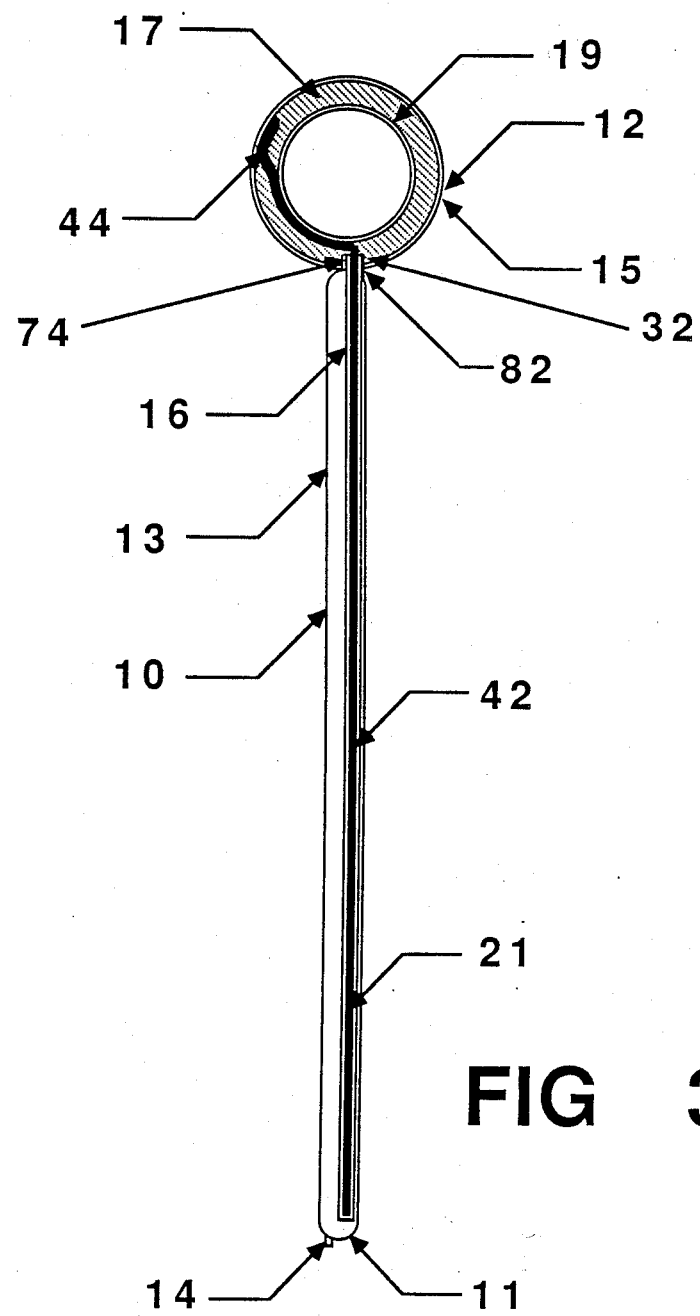
FIG. 3 is a cross sectional view of the solar thermal collector system of FIG. 1 taken along the line 2 of that figure.

FIG. 3 shows a cross section of the solar thermal collector system of FIG. 1 taken along the line 2 of FIG. 1. The cross section of the heat storage system 12 in this figure shows a heat storage tank 19 for storing heat collected by panel 10, a thermal insulation 17 to reduce heat loss, and a cover 15 to protect the system from weathering, moisture, and possibly serve as a heat dissipating surface, as discussed below.

Now considering panel 10, FIG. 3 shows that the open ends of each glass absorbing tube 16 are outside the vacuum, all at the same end of the glass solar collector panel 10. These open ends are sealed with vacuum seal 32 to the outer end of a plurality of corresponding glass tubular sections 82. These glass tubular sections 82 are part of the glass solar collector panel 10, and are substantially concentric with the glass absorber tubes 16. Usually much of the absorbing tubes 16 interior to the concentric glass tubular sections 82 and/or the interior wall of the substantially concentric glass tubular sections 82 will be coated with a metal, such as silver, copper or aluminum to reduce radiation heat loss.

The kind of glass for the upper glass sheet 13 for the lower glass sheet 11, for the substantially concentric glass tubular sections 82, and for the absorbing tubes 16 must be the same, or have the same thermal expansion, that is, be of like glass, to reduce the stresses associated with formation of the panel 10 and its use. The fact that this glass is never shocked by hot or cold heat transmission fluids makes possible the use of low cost, but high thermal expansion glass. This is a vary important and inventive feature of the design of this solar thermal collector system. This desirable feature is essential for all the embodiments of this invention.

FIG. 3 also shows one of a plurality of metal heat pipes 21, with an evaporator section 42 inside the glass absorbing tube 16, an adiabatic section 74 between the glass absorbing tube 16 and the heat storage tank 19, and a condenser section 44 in good thermal contact with the heat storage tank 19 and cover 15. This particular design uses a gas loaded variable conductance heat pipe designed so that heat transfer to the cover 15 can be minimal until a limiting design temperature is approached. The cover 15 must be a good thermal conductor with a coating of high emissivity, extended exposed surface and possibly other standard characteristics so it can serve to dissipate heat and limit the temperature of the heat stored in the heat storage tank 19. The insulation 17 and a relatively thin wall for the heat pipes 21 between the storage tank 19 and the cover 15 reduce heat transfer between the storage tank 19 and the cover 15 until the limiting design temperature is approached.

With this gas loaded heat pipe design, the heat pipes 21 and absorbing tubes 16 will tend to operate well above the storage tank 19 temperature except when the storage tank 19 temperature approaches the limiting design temperature. This leads to noticeably higher radiation and conduction losses, except when this solar thermal collector system is designed for operation at lower temperatures. To have the absorbing tubes 16 and heat pipes 21 operate closer to the storage tank 19 temperature, and thus reduce these higher radiation and conduction losses, the heat pipes 21 can be designed to have a larger cross section (volume) between the storage tank 19 and cover 15 and at their end. Alternatively, each heat pipe can be replaced by two heat pipes, one without gas loading which operates between the absorbing tubes 16 and the storage tank 19, and one with gas loading which operates between the storage tank 19 and cover 15. The maximum heat storage tank 19 temperature also can be limited by other means known in the prior art.

Although the solar thermal collector system of FIGS. 2 and 3 are shown with length aligned parallel to the length of the page, the solar thermal collector system in operation will normally be sloped, making an angle with the horizontal of approximately the latitude angle or the slope of the structure on which it is mounted. The heat pipes 21 must be largely below the heat storage tank 10. Sloping, at least of part of the adiabatic sections 74 of the heat pipes 21, along with positioning of any wick internal to the heat pipes 21, is necessary to minimize heat loss from heat storage tank 19, when the normally evaporator sections 42 of the heat pipes 21 are at a lower temperature than the normally condenser sections 44. The amount of slope of the glass solar collector panel 10 and evaporator section 42 of heat pipe 21 can be fixed to maximize solar energy collection at the collecting site or to fit the structure on which the solar thermal collector system is to be mounted (not shown in any of the figures).

Figure 16:
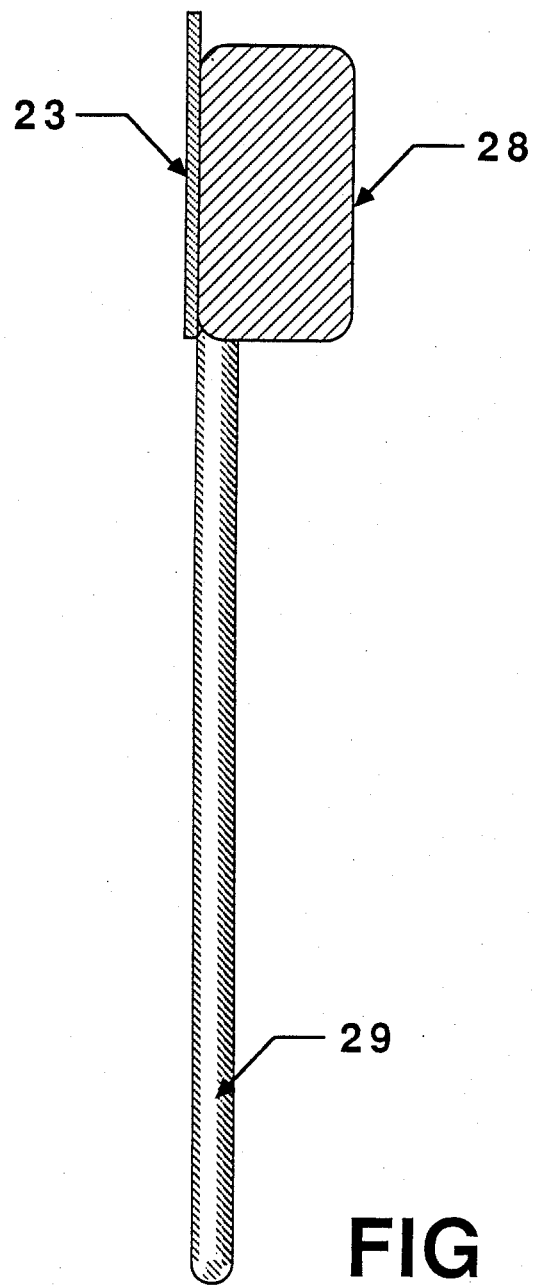
FIG. 16 is a side view of the solar thermal collector system of FIG. 15.
Figure 17:
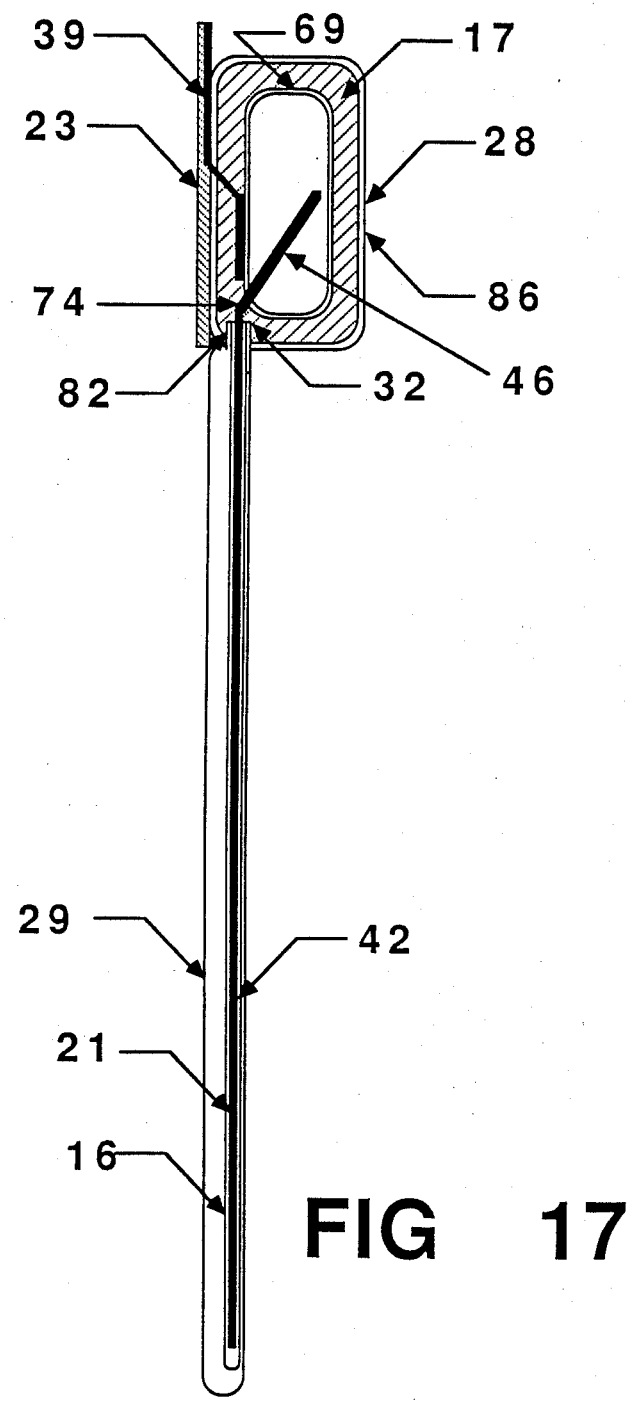
FIG. 17 is a cross section of the solar thermal collector system of FIG. 15 along the line 5 of FIG. 15.

Although the evaporator sections 42 and adiabatic sections 74 of heat pipes 21 are shown to be straight in FIG. 3, a bend could be introduced in the adiabatic section 74. This might be desirable to aid in positioning the heat storage tank 19 and heat pipe 21, relative to each other and to the supporting structure (not shown in the figures). One might wish, for example, to have the storge tank 19 be largely below the surface of a roof on which it is mounted, for esthetic or utility reasons, as shown in FIGS. 16 and 17 below.

It is anticipated that the heat pipes 21 will be without wick, to reduce cost. This then requires a monotonically decreasing height in going from the far end of the condenser section 44 to the far end of the evaporator section 42.

Although the condenser section 44 of the heat pipe 21 is shown in good thermal contact with one side of the heat storage tank 19 (preferred), it could be in thermal contact with, and proceed around, the other side, or enter into the storage tank 19. Thermal efficiency, cost and appearance determine the best choice of these alternatives.

Generally, the adiabatic section 74 of the heat pipe 21 should be relatively short to reduce heat loss and cost. The length of the substantially concentric glass tubular sections 82 leading to the vacuum seals 32 must be sufficient to prevent heat from overstressing the glass of the glass solar collector panel 10 and to reduce heat loss. This length generally should be about two to several times the diameter of the absorbing tube 16.

Since the inventory of fluid in the heat pipes 21 is small, even relatively expensive fluids can be used, if their combination of freeze temperature, stability, toxicity, and heat transfer properties are preferred.

Figure 4:
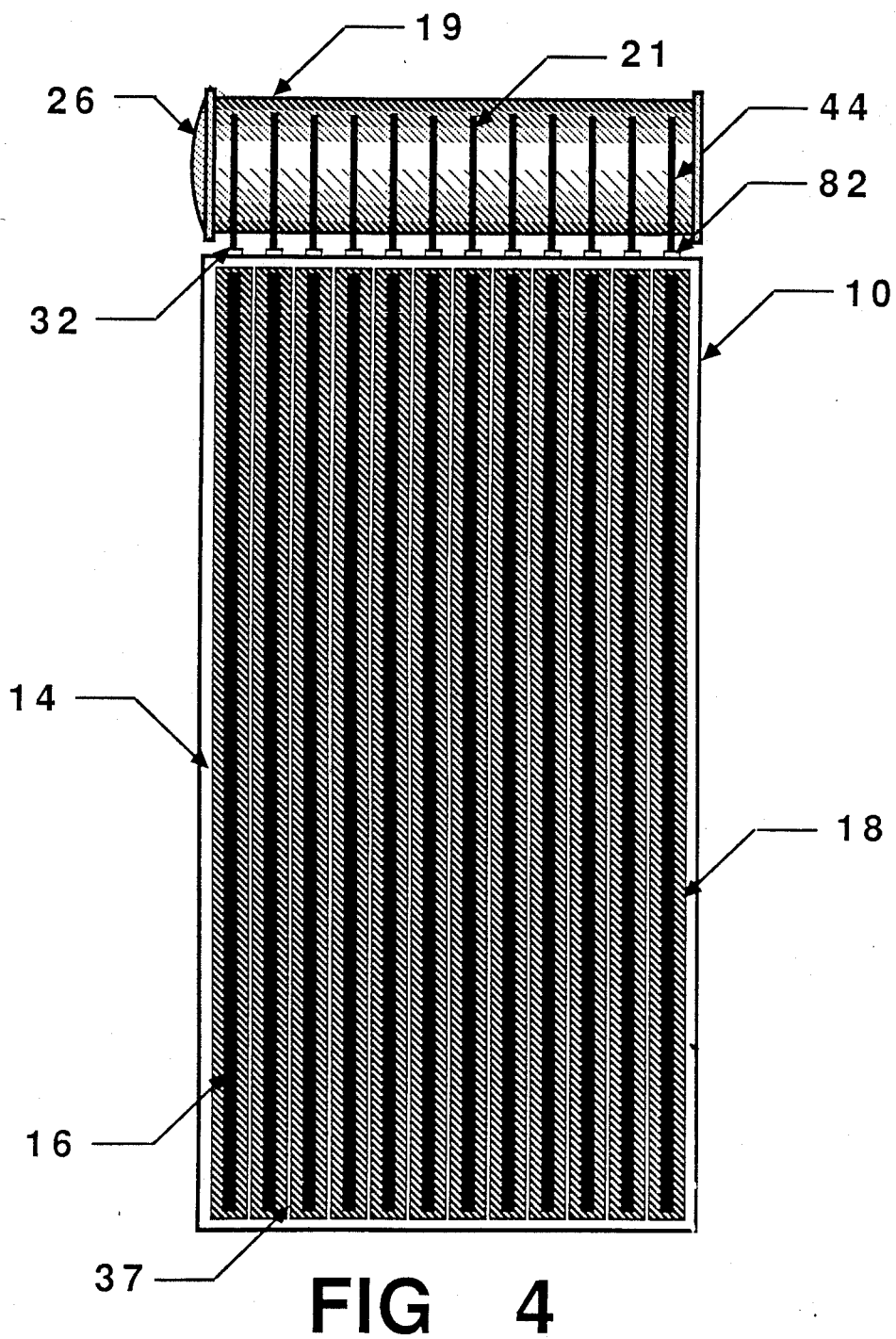
FIG. 4 is a top view of the solar thermal collector system of FIG. 1 with the insulation and cover removed from the heat storage system. Variable conductance metal heat pipes are placed in good thermal contact with the heat storage tank, and their upper ends are in good thermal contact with the heat storage system cover, when it is in place.

FIG. 4 shows a top view of the solar thermal collector system of FIG. 1 with the cover 15 and the insulation 17 removed, in order to show the rest of the system. An end cap 26 closes one end of storage tank 19. No end cap 26 is shown at the other end to indicate that this solar thermal collector system can be joined with other solar thermal collector systems to form an array of larger collecting area and heat storage capacity.

Figure 5:
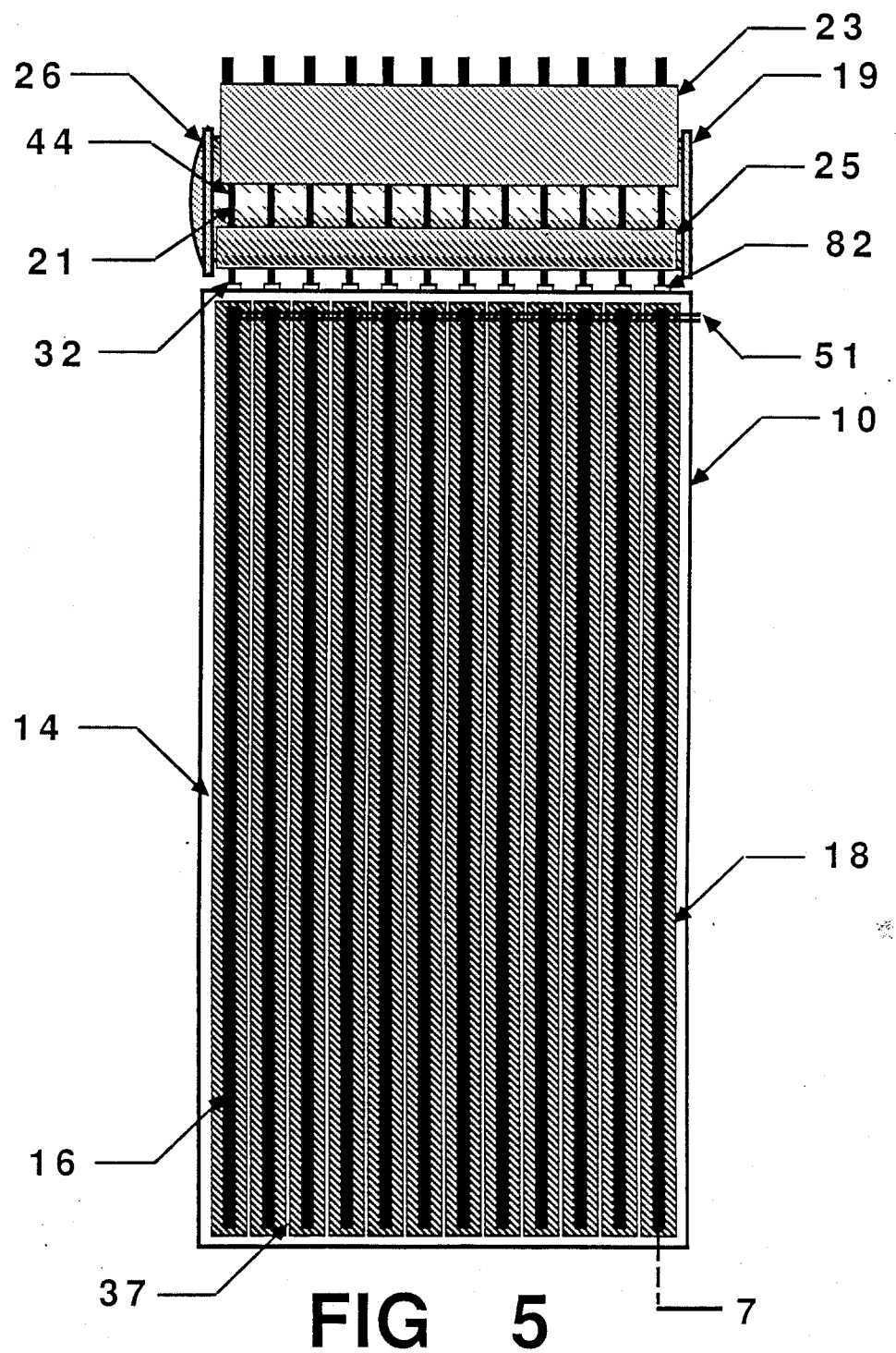
FIG. 5 is a top view of the solar thermal collector system of FIG. 1 in which an alternate method is used to transfer heat from the variable conductance heat pipes to the heat storage tank and to a heat dissipating surface. The cover and insulation are removed to show the rest of the system.

FIG. 5 shows an alternate design to that of FIGS. 1-4, in which a clamping plate 25 is used to provide good thermal contact between heat pipes 21 and storage tank 19. In addition, a heat dissipation surface 23 is shown, which can increase the area available to dissipate heat when the limiting design temperature is reached.

The solar thermal collector system of this invention has a very high degree of functional integration. However, as thus far discussed, this collector system serves only to collect solar energy in the form of heat energy. With this system, if one wishes to make electricity, one would anticipate operating at high temperatures and using a heat engine to run an electric generator. While this method of making electricity is quite feasible with a highly efficient collector of this type, there is an alternate method which may prove to be lower in cost in the future. The use of photovoltaic materials to generate electrical power from solar radiation is now quite common and is expected to have lower cost in the future. The material used for photovoltaics has a band gap of about the same energy as selective absorbers. For solar radiation of wavelengths shorter than the band gap wavelength, the material is quite absorbing for solar radiation. Thus, this material can make a good selective absorber. It is expected that such a material can be used to generate both electricity and heat, at the same time. In the design of FIG. 5, the selective absorber is a photovoltaic selective absorber. To indicate this, connecting wires and lead wires 51 coming out of the panel 10 are indicated.

Figure 6:
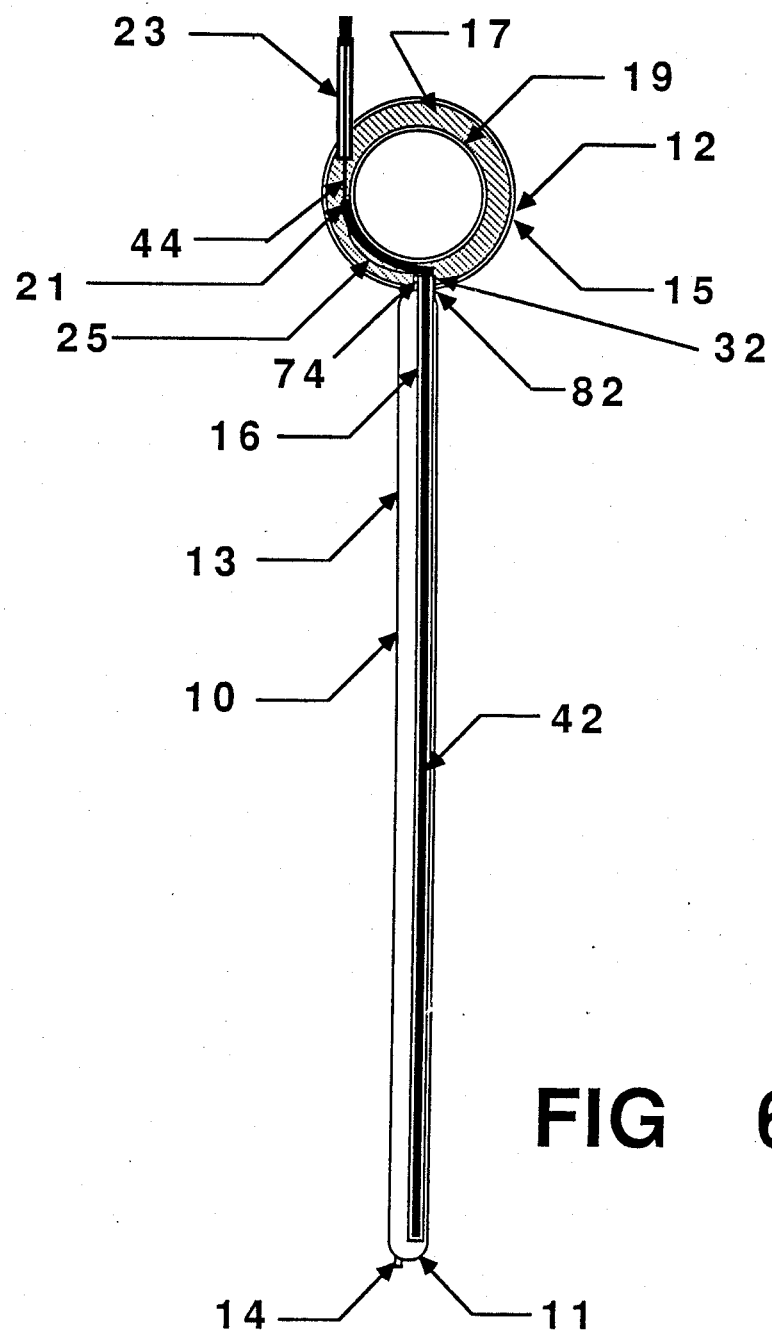
FIG. 6 is a cross section of the solar thermal collector system of FIG. 5 along the line 7 of FIG. 5 with the cover and insulation now in place.

FIG. 6 shows a cross section of the solar thermal collector system of FIG. 5 along the line 7 of FIG. 5. Good thermal contact is provided between the end of the condenser section 44 of the heat pipe 21 and the heat dissipation surface 23, as well as between the condenser section 44 and the heat storage tank 19 using clamping plate 25. Thermal contact between the condenser section 44 and the cover 15 is also possible.

Figure 7:
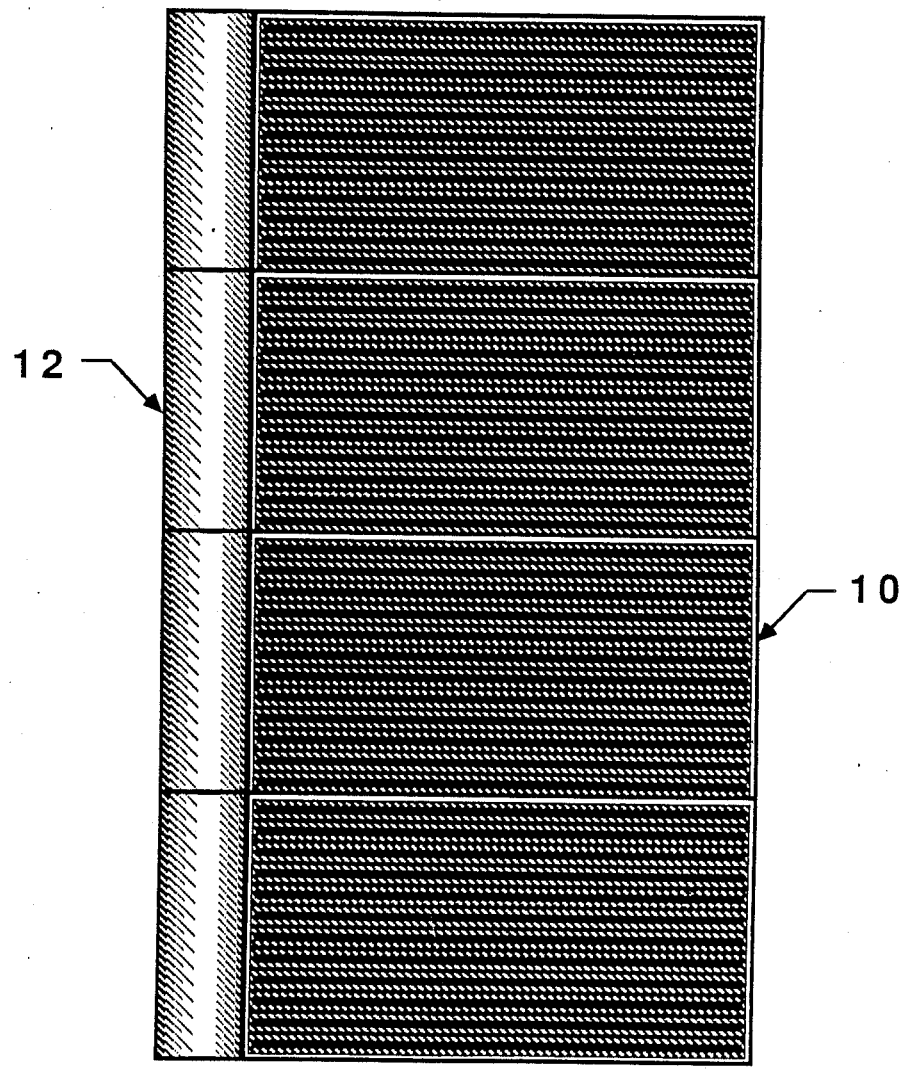
FIG. 7 is a top view of four solar thermal collector systems like that of FIG. 1 or 5 connected together in an array.

FIG. 7 shows four solar thermal collectors such as those of FIGS. 1-6 connected together to form an array of larger collecting area and heat storage capacity.

Figure 8:
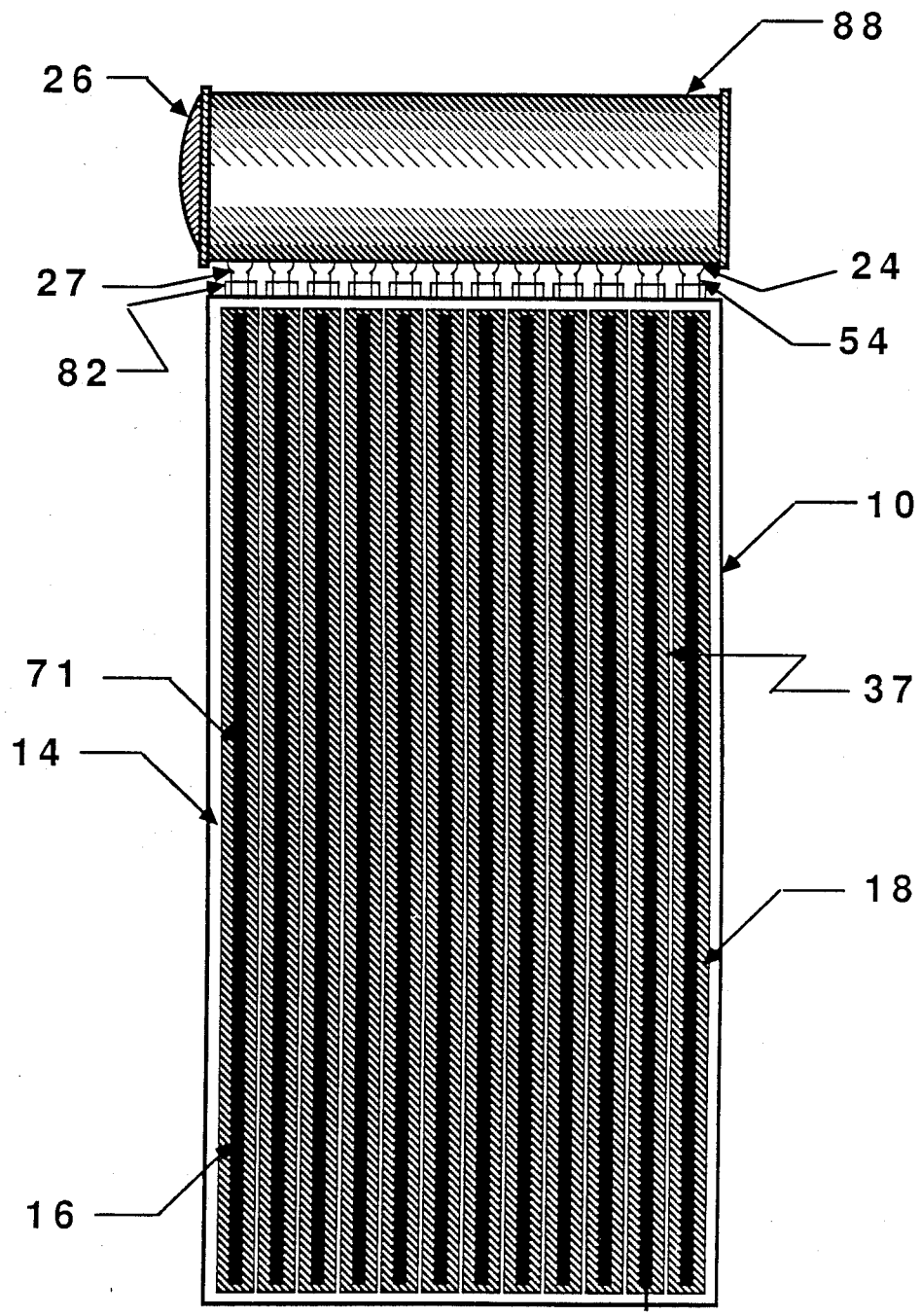
FIG. 8 is a top view of an embodiment of the solar thermal collector system which uses one or more glass solar collector panels as the evacuated glass solar collector, with a plurality of glass tubular heat pipes to transfer heat from the glass solar collector panel to the heat storage system. The insulation and cover of the heat storage system are removed to show the rest of the system.

FIG. 8 shows the top view of another embodiment of the solar thermal collector system, which also uses one or more glass solar collector panels 10 for the evacuated glass solar collector. This embodiment differs from that of FIG. 1 by having a multiplicity of substantially linear glass heat pipes 71 for the tubular heat pipe system. The corresponding multiplicity of glass absorbing tubes 16 also serve as the evaporator section of the glass heat pipes 71. The adiabatic secton 27 of each glass heat pipe proceeds from the evaporator section 16 to the vacuum seal 54 at the outer end of glass tubular section 82. The adiabatic section proceeds from the vacuum seal 54 to the condenser section 24 which is inside storage tank 88 as shown. Other methods of providing good thermal contact with the heat storage tank 88 and heat storage medium, such as those previously discussed could also be used.

Figure 9:
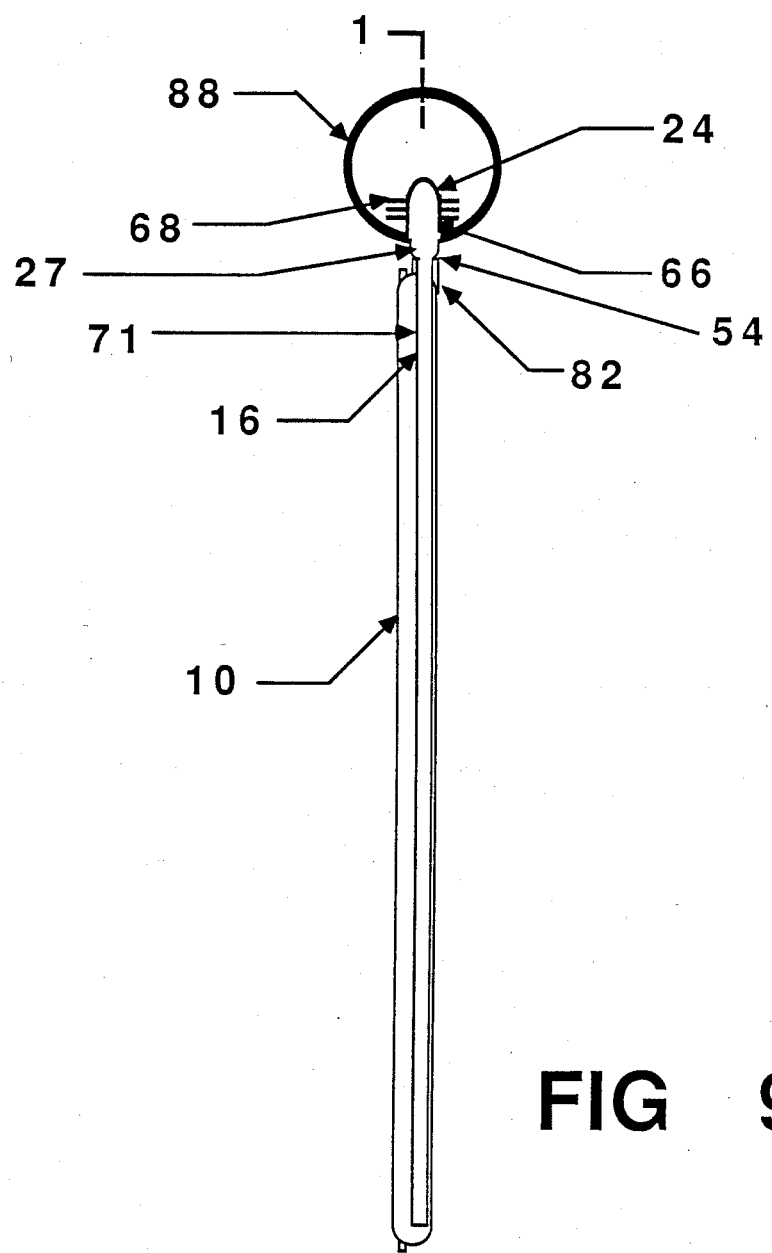
FIG. 9 is a cross section of the solar thermal collector system of FIG. 8 along the line 3 of FIG. 8.

FIG. 9 shows a cross sectional view along the line 3 of FIG. 8, of the glass solar collector panel 10, a substantially parallel linear heat pipe 71, and the heat storage tank 88. The condenser part 24 of one of the heat pipes 71 is inside the re-entrant cavity structure 66 with fins 68.

Figure 10:
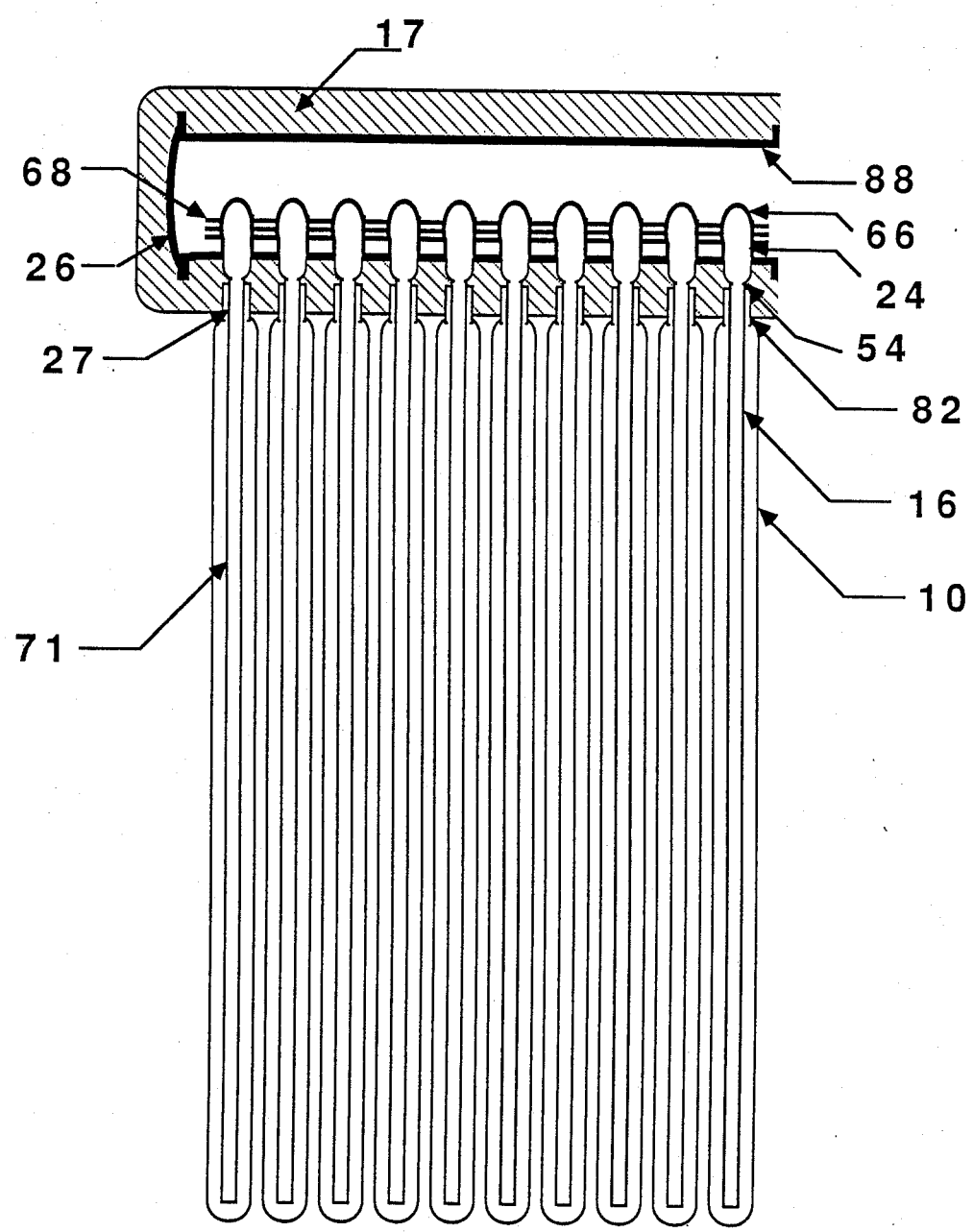
FIG. 10 is a cross section of the solar thermal collector system of FIGS. 8 and 9 taken along line 1 of FIG. 9. The insulation and cover are in place.

FIG. 10 shows a cross secional view through the line 1 of FIG. 9 of the solar thermal collector system of FIGS. 8 and 9 with the multiplicity of substantially parallel linear glass heat pipes for the tubular heat pipe system.

Figure 11:
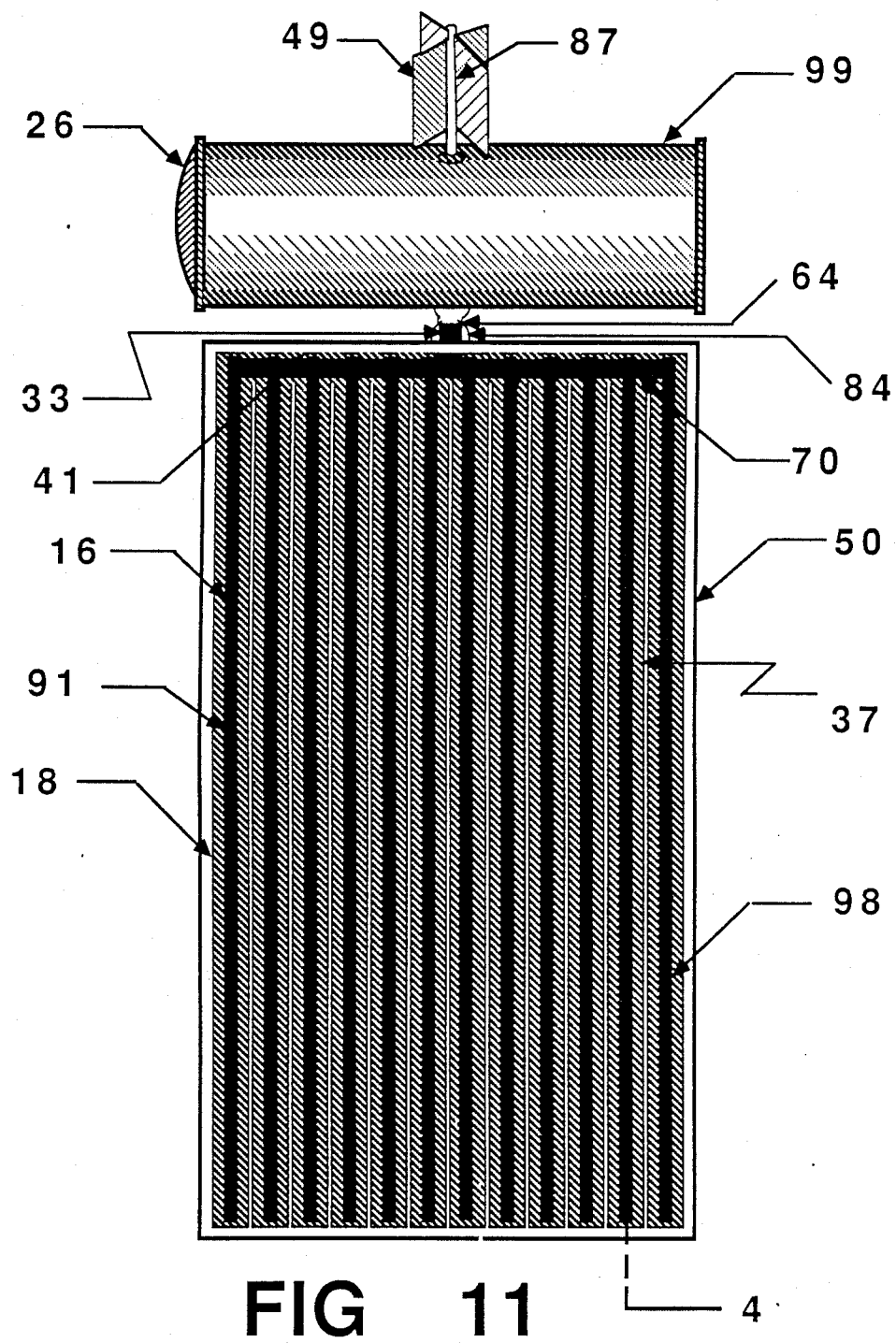
FIG. 11 is a top view of an embodiment of the solar thermal collector system which uses one or more glass solar collector panels as the evacuated glass solar collector, with a single glass tubular heat pipe to transfer heat from each panel to the heat storage system. The cover and insulation of the heat storage tank are removed to show the remaining parts of the system more clearly.

FIG. 11 shows a top view of an embodiment of the solar thermal collector system in which one or more evacuated glass panels 50 are used for the evacuated glass solar collector with single glass heat pipe 91, for the tubular heat pipe system. Each glass heat pipe 91 has the plurality of substantially parallel linear glass absorbing tubes 16, which join a cross manifold tube 70. The substantially parallel linear glass absorbing tubes 16 and cross manifold absorbing tube 70 are positioned in the corresponding plurality of substantially parallel linear concentrating troughs 18 and a cross manifold trough 41 to receive the solar radiation concentrated by these troughs. Under normal operation, the glass absorbing tubes 16 and cross manifold absorbing tube 70 comprise substantially the evaporator section 98 of heat pipe 91. Heat pipe 91 leaves the concentration region along the adiabatic length 33, which reaches the exit from the panel through the substantially concentric glass tubular section 84 of the evacuated glass panel 50 to which it is sealed with a vacuum seal 64 where it exits the vacuum.

Figure 12:
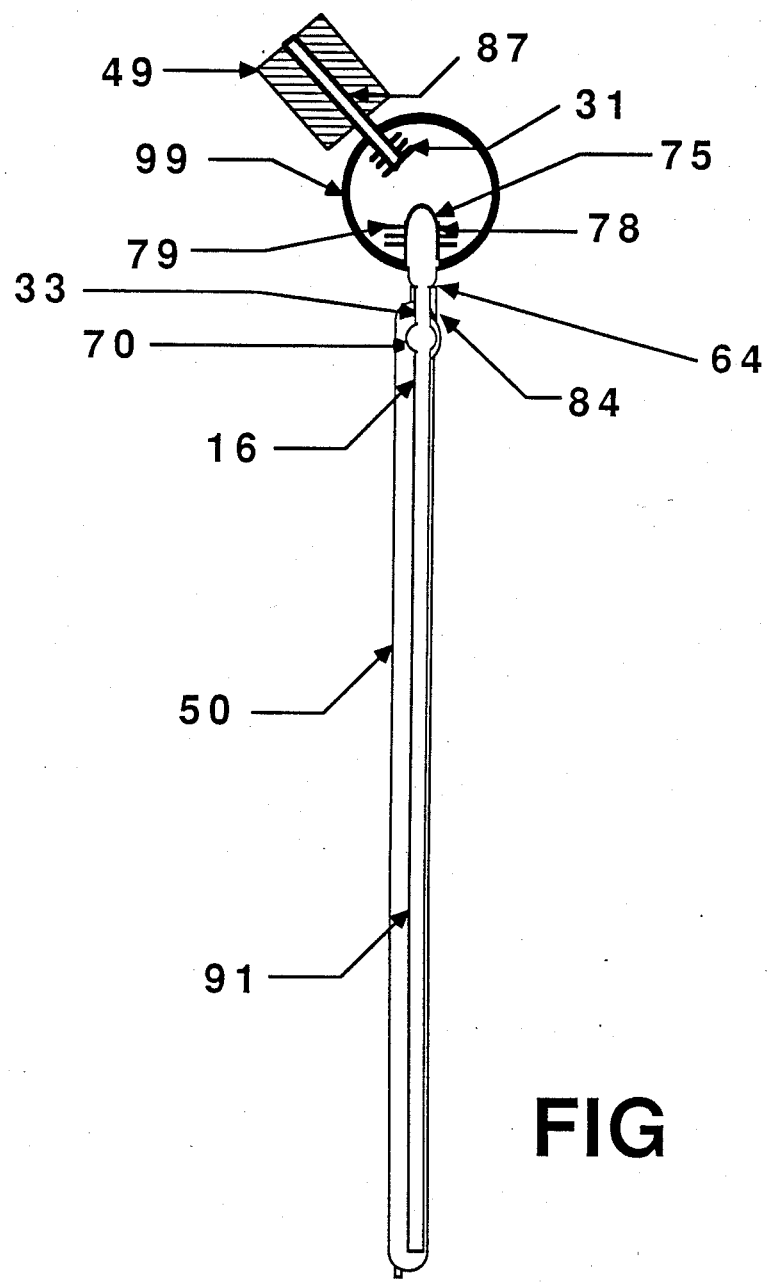
FIG. 12 is a cross section of the solar thermal collector system of FIG. 11 along the line 4 of FIG. 11.

FIG. 12 shows a cross section of the solar thermal collector system of FIG. 11 taken along the line 4 of FIG. 11. In FIG. 12, the adiabatic length 33 proceeds from the vacuum seal 64 to the condenser section 75. In this embodiment the condenser section 75 has been placed inside re-entrant cavity structure 78 with fins 79 (preferred). Other means of heat transfer between condenser section 75 and the heat storage tank 99 and the heat storage medium, such as previously described are also possible. In FIG. 12, a gas loaded variable conductance heat pipe 87 with cooling fins 49 and heat collection fins 31 is shown as the means of limiting the maximum heat storage tank 99 temperature. Other means are also possible.

Although the heat pipe 91 is shown to be straight in FIG. 12, a bend could be introduced, probably in the adiabatic length 74. This might be desirable to aid in positioning the heat storage tank 99 and glass solar collector panel 50 relative to each other and to the supporting structure (not shown in the figures).

Figure 14:
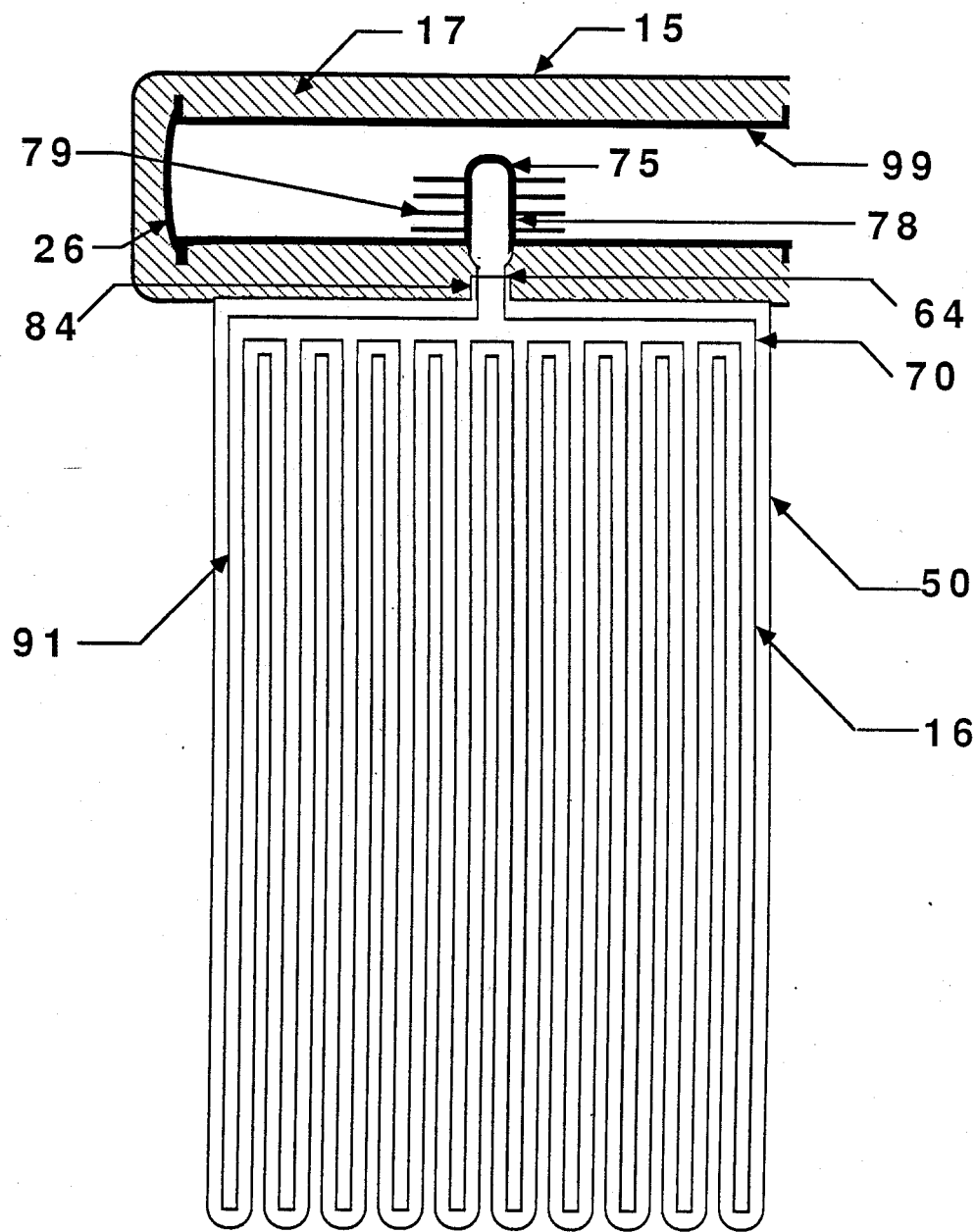
FIG. 14 is a cross section of the solar thermal collector system of FIG. 11 along the line 8 of FIG. 13.

The inside dimensions of the re-entrant cavity structure 78 are made to fit the condenser section 75 of the heat pipe 91. This fit may be aided by a thin thermally conducting filler material. The wall of the re-entrant cavity structure 78 would probably be metallic, and must be strong enough to withstand the internal pressure of the heat storage tank 99. The position of the re-entrant cavity structure 78 is determined by the slope of the heat pipe 91 and the desired circulation inside the heat storge tank 99. The means of heat removal and variable conductance heat pipe 87 can be positioned somewhat opposite to the position of the re-entrant cavity structure 78, as shown. The re-entrant cavity structure 78 can be fitted with fins 79, as shown in FIGS. 12 and 14, to aid in the transfer of heat to the heat storage liquid, or the fins can be omitted. Alternatively, the re-entrant cavity structure 70 may be omitted and the condenser section 75 of the heat pipe 91 inserted directly into the heat storage liquid and sealed at the entry point to prevent leakage of the heat storage liquid. Other means of coupling the heat pipe 91 to the heat storage tank 99 and heat storage medium are also possible.

Figure 13:
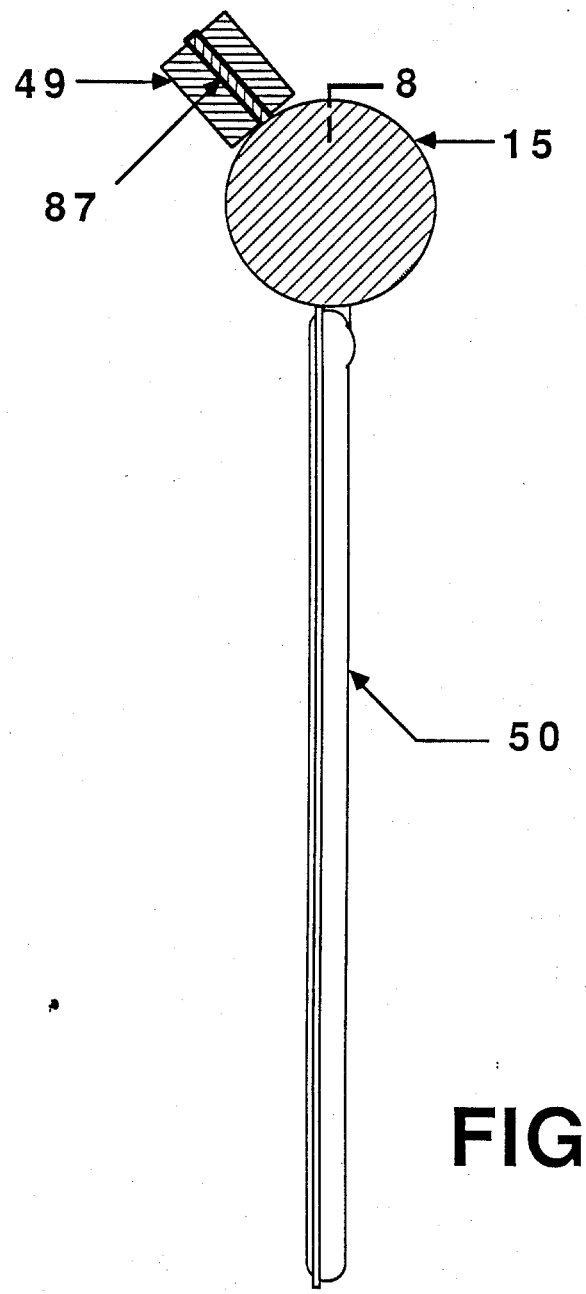
FIG. 13 is a side view of the solar thermal collector system of FIG. 10 with the cover and insulation in place.

FIG. 13 shows a side view of the solar thermal collector system of FIGS. 11 and 12. The thermal insulation 17 and cover 15 are in place around the heat storage tank 99 in this figure.

FIG. 14 shows a cross sectional view of the solar thermal collector system of FIGS. 11-13 taken along the line 8 of FIG. 13. The thermal insulation 17 and cover 15 of the heat storage tank 99 are in place. A neighboring solar thermal collector system would be attached to the open end of the storge tank 99 to form an additional part of an array of solar thermal collector systems, and would be similarly insulated.

Figure 15:
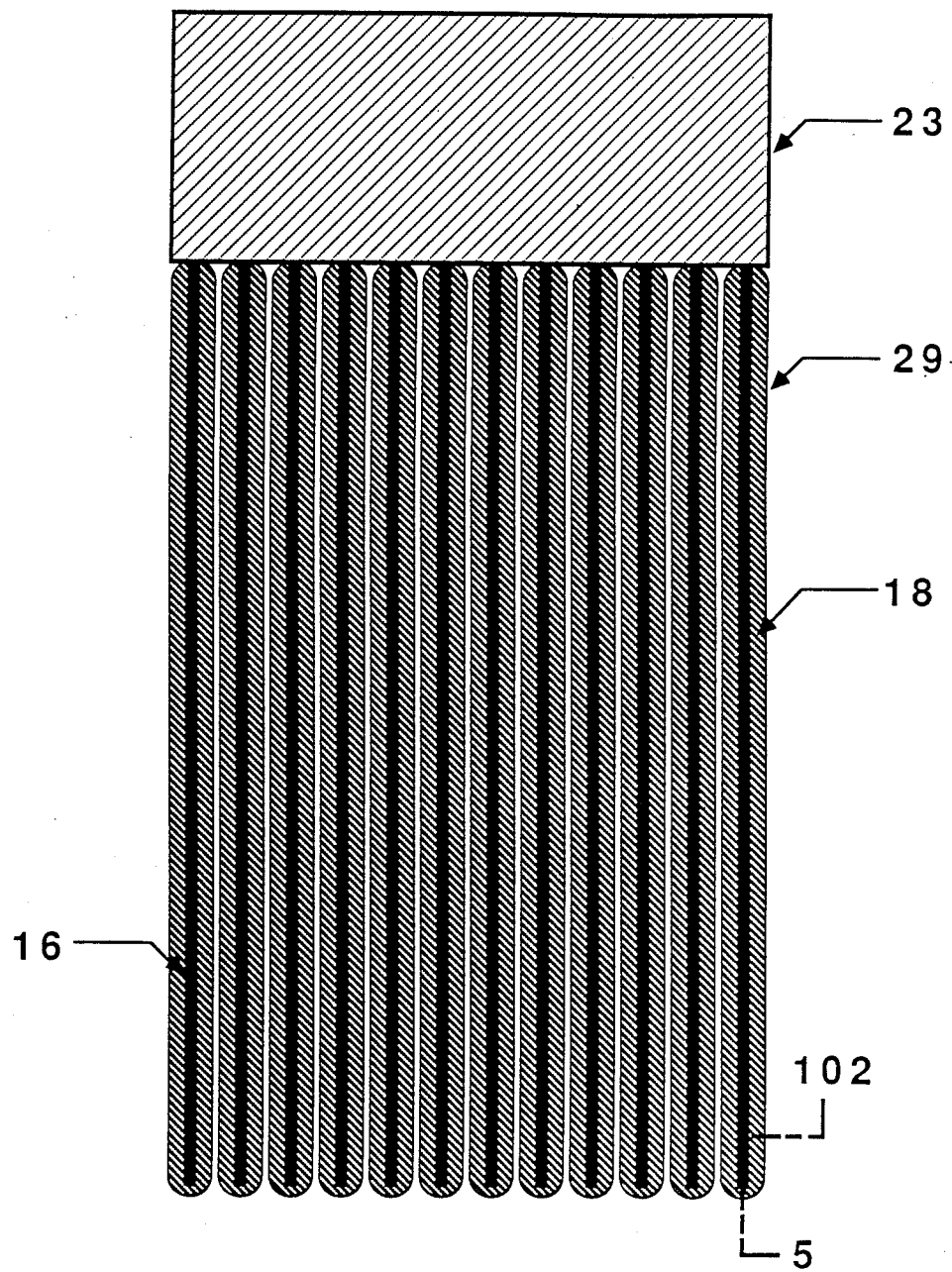
FIG. 15 is a top view of an embodiment of the solar thermal collector system which uses a multiplicity of glass solar collector tubes for the evacuated glass solar collector, and a multiplicity of tubular metal heat pipes for transfer of heat to the heat storage system from each glass solar collector tube.

FIG. 15 shows a top view of a solar thermal collector system in which the evacuated glass collector consists of a plurality of glass solar collector tubes 29 with concentrating troughs 18 and glass absorbing tubes 16, instead of consisting of one or more glass solar collector panels. The heat pipe system consists of a plurality of metal heat pipes, as in the embodiments of FIGS. 1–4, or 5 and 6. The heat dissipation surface 23 lies in the same plane as the array of glass solar collector tubes 29 in the embodiment of FIG. 15. Just as for the panels, it is a very important and inventive feature of this invention that each glass solar collector tube 29 is formed entirely of low cost, high thermal expansion glass, thus greatly reducing the cost of the solar thermal collector system without sacrificing performance or durability.

FIG. 16 shows a side view of the solar thermal collector system of FIG. 15 The relative arrangement and form of the heat storage system 28, heat pipe system, and glass solar collector tubes 29 could be quite similar to that of the storage system 12, heat pipe system, and panel 10 of FIGS. 1–4, or 5 and 6, but has been changed to show a variation in their arrangement and form. Greater detail of the design of glass solar collector tubes 29 are found in the prior art.

A solar thermal collector system which uses one or more glass solar collector panels, such as those of FIGS. 1–14, is probably preferred over one using the substantially parallel linear glass solar collector tubes, as in FIGS. 15 and 16. The use of a panel, rather than tubes, allows for easier coating of the mirror concentrator. In addition, reduction of window reflectance, if done, is easier and the shaping of the concentrating surface of the glass appears to be considerably easier. Further, the solar thermal collector system using an array of panels, heat pipe systems, and heat storage systems can be more readily and reliably made an integral part of the roof or walls of the structure supporting the solar thermal collector system of this invention. However, individual tubes are cheaper and easier to replace than a panel, if there is breakage. The process of vacuum sealing a glass solar collector panel is somewhat more difficult than that of sealing glass solar collector tubes. The operational efficiency of the two embodiments are expected to be about the same.

FIG. 17 shows a cross section along the direction of the line 5 of FIG. 15 of the solar thermal collector system of FIGS. 15 and 16. The changes in the metal heat pipes and heat storage system from that of the embodiments of FIGS. 1–4, or 5 and 6 are to put a bend in the adiabatic section 74, have the condenser section 46 inside the heat storage tank 19, have a separate gas loaded variable conductance heat pipe 39 for limiting the maximum temperature of the heat storage system 28, and make the heat storage tank 69 of rounded rectangular shape. Part of the changes allow placing the heat storage system 28, with cover 86, insulation 17 and tank 69, below the roof or other surface on which is it mounted. These changes make the solar collector system more attractive esthetically and may make it simpler to utilize the heat collected in the heat storage system 28, but could cause a small increase in heat loss by the heat pipe system.

Figure 18:
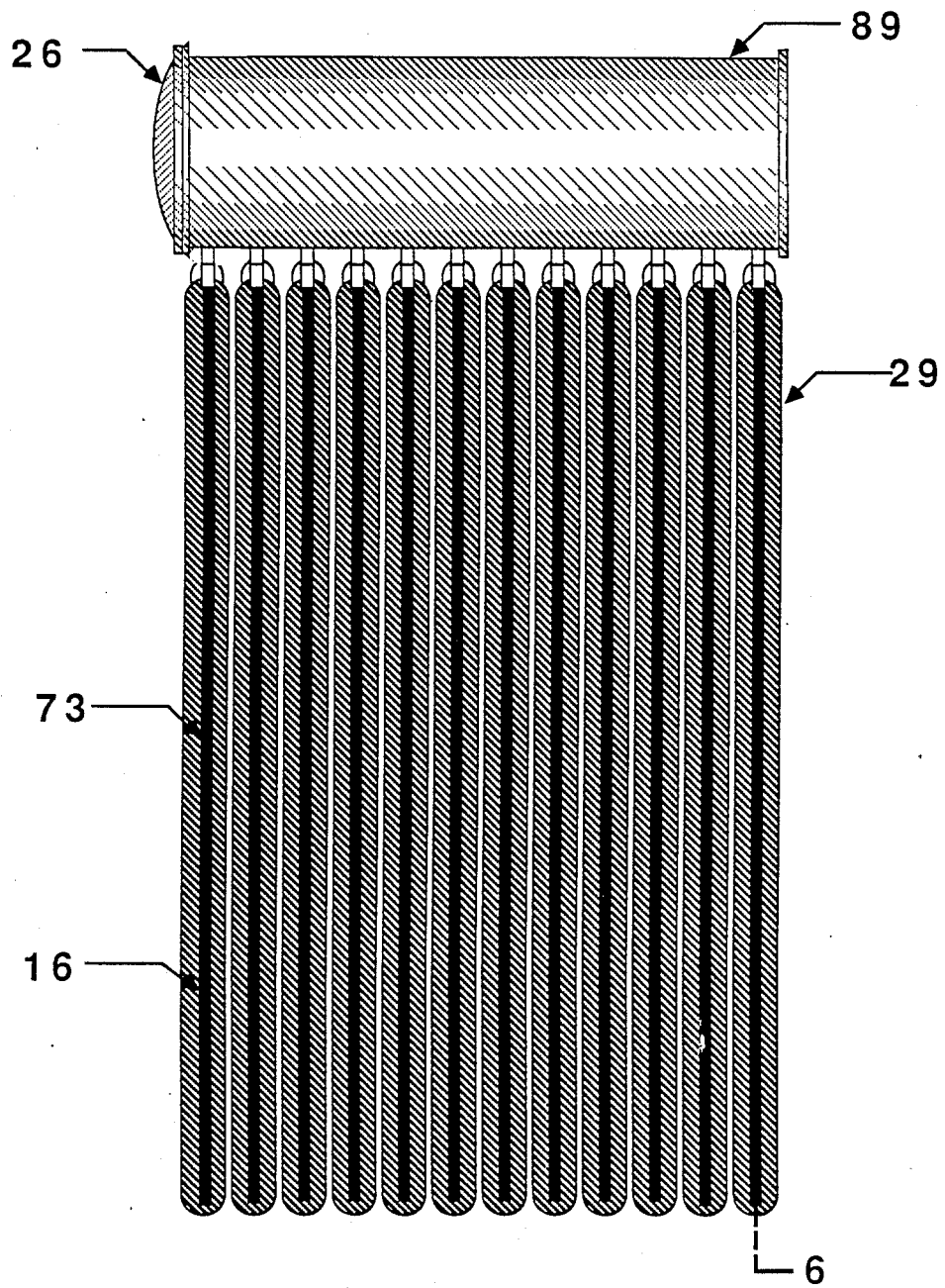
FIG. 18 is a top view of an embodiment of the solar thermal collector system which uses a multiplicity of substantially parallel glass solar collector tubes for the evacuated glass solar collector, and a corresponding multiplicity of tubular glass heat pipes to transfer the heat to the heat storage system. The insulation and cover for the heat storage system are removed to show more clearly the rest of the system.
Figure 19:
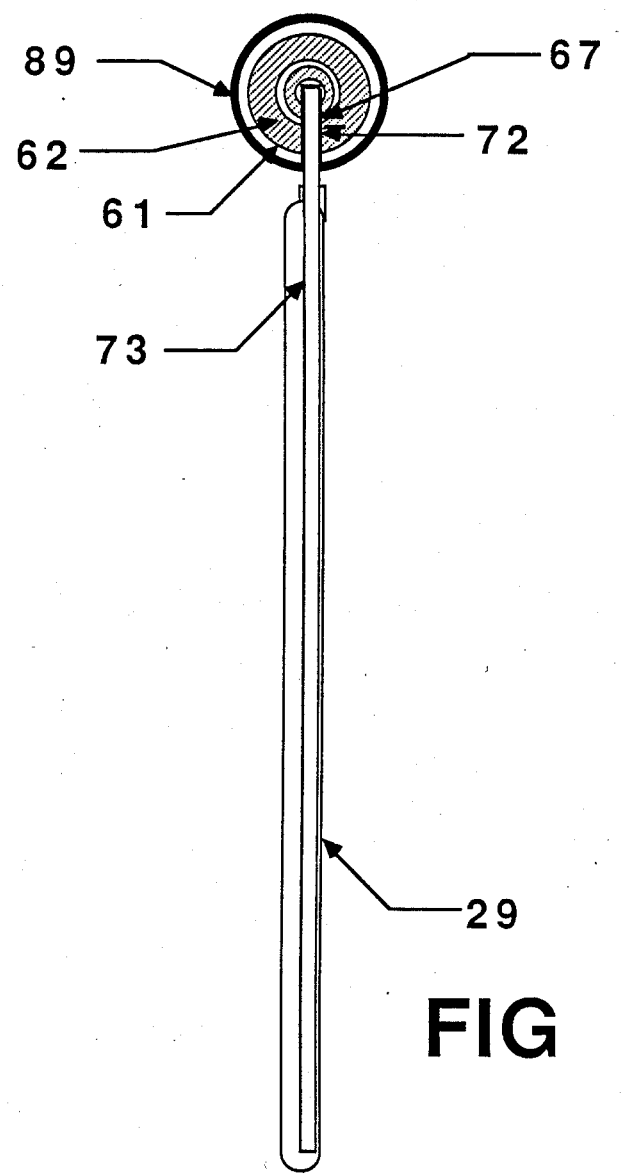
FIG. 19 is a cross section of the embodiment of the solar thermal collector system of FIG. 18 along the line 6 of FIG. 18.

FIG. 18 shows a top view, while FIG. 19 shows a cross sectional view along the line 6 of FIG. 18 of another embodiment of the solar thermal collector system of this invention in which a plurality of substantially parallel linear glass solar collector tubes 29 is used for the evacuated glass solar collector. A plurality of substantially parallel linear glass heat pipes 73 serve as the tubular heat pipe system, in a manner similar to the embodiment of FIGS. 8–10, with absorbing tube 16 serving as the evaporator sections of glass heat pipes 73. An alternative shape is used for the condenser section 72 of the heat pipes 73. There are no fins on re-entrant cavity structure 67. Also, a volume 61 containing a phase change material 62 has been included in the storage tank 89. The change in glass heat pipe shape from that of FIGS. 8–10 is to indicate a possible variation in the heat pipe design. It is lower in cost to form the heat pipes 73, shown in FIGS. 18 and 19, with the same diameter for the entire length. However, the maximum pressure reached by a heat pipe with a given inventory of fluid is lower if the volume is made larger, by enlarging the upper end, in a manner similar to that indicated in FIGS. 8–14. This also improves heat transfer to the storage tank liquid by increasing the area of heat transfer, as do the fins in the embodiments of FIGS. 8–14.

The phase change volume 61 and phase change material 62 shown in FIG. 19 will tend to maintain a more constant temperature within the heat storage system and can improve the heat storage energy density, at added cost and slower response to the removal or addition of heat to the system. The solar thermal collector systems shown in FIGS. 8–10, 18 and 19 show no variable conductance heat pipe for temperature control, since these systems use alternate means of limiting the maximum heat storage tank temperature. These means can be limiting the inventory of fluid in the heat pipes, using pressure release valves, bi-metallic strips or pressure sensitive devices to signal or react to excessive temperatures or pressures in order to cause temperature control measures to occur, or any combination of these, for example. Control of the maximum heat storage tank temperature is very important and must be carefully designed into the solar thermal collector system as a safeguard to prevent damage to the system and/or the structure on which it is mounted. The solar thermal collector system of this invention is highly efficient and can reach very high temperatures, without temperature control. It appears preferable to have passive temperature control.

FIGS. 1–19 have indicated the heat storage tanks as having horizontal axes. Heat storage tanks with axes oriented other than horizontal are also possible. In addition, FIGS. 1–19 show only one evacuated glass panel or array of evacuated glass tubes for each heat storage tank. For some occasions, such as for some tropical sites, more than one panel or array of tubes might be preferred for each heat storage tank, perhaps with two panels or arrays of tubes placed on opposite sides of the heat storage tank. If the width of a panel is made less than the length of a storage tank, then too more than one panel for each heat storage tank may be used. For each solar thermal collector system with more than one panel or array of tubes for each storage tank, the troughs 18 and glass absorbing tubes 16 for each panel or array separately will be substantially parallel. For purpose of the claims, we will call the troughs 18 and glass absorbing tubes 16 substantially parallel, since they are substantially parallel in groups.

Figure 20:
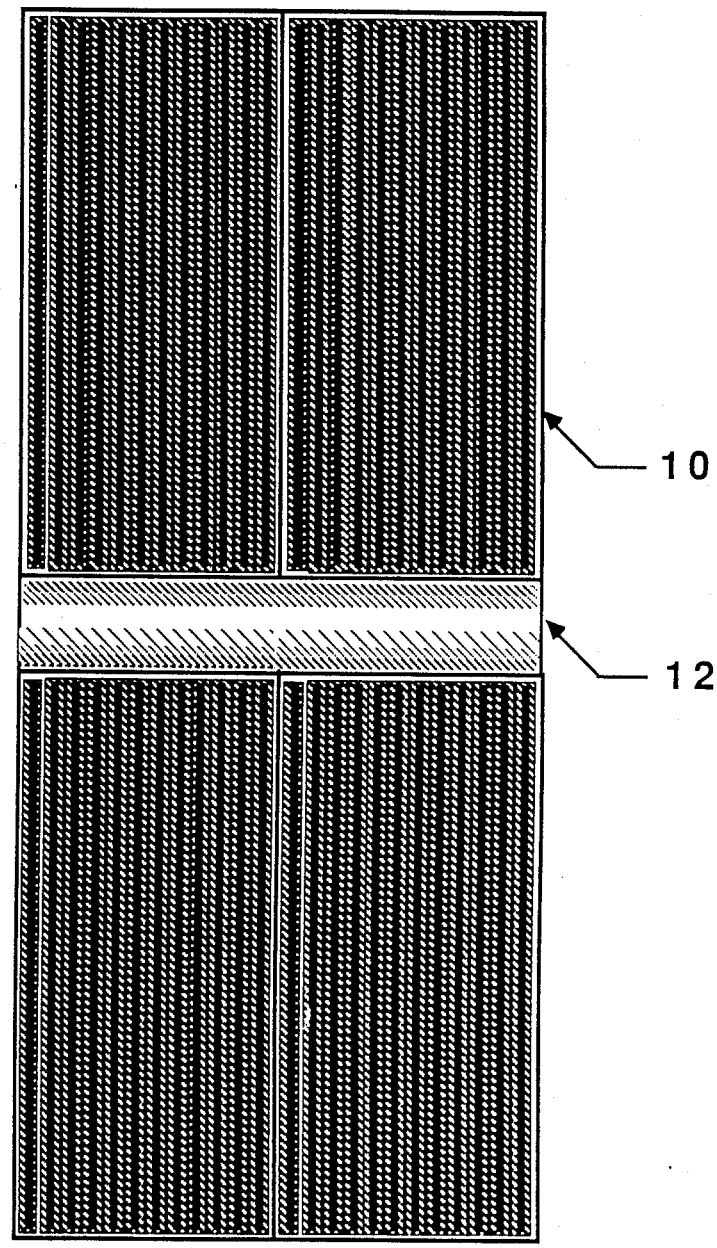
FIG. 20 is a top view of the embodiment of FIG. 1 in which four, rather than one, solar collector panels are used with each heat storage system.
Figure 21:
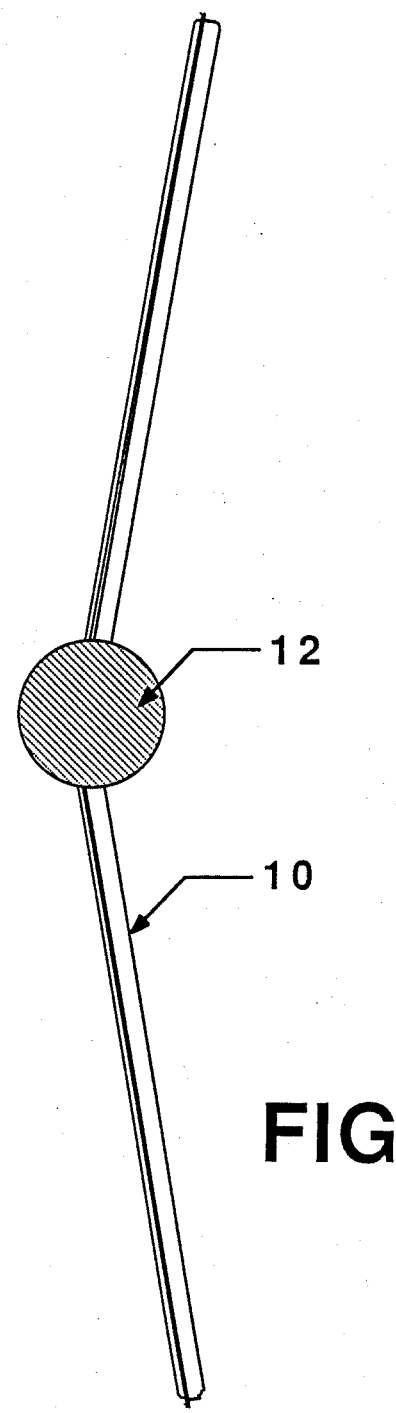
FIG. 21 is a side view of the solar thermal collector system of FIG. 20.

FIG. 20 is a top view showing a solar thermal collector system with four glass solar collector panels 10 supplying heat to one heat storage system, as might occur in the tropics. FIG. 21 is a side view of the solar thermal collector system of FIG. 20. The glass solar collector panels must be slightly sloped away from the heat storage system to provide heat transfer to the storage system and not away from it. The two pairs of panels 10 are shown at different angles to the tank in FIG. 21 to show this sloping. A similar arrangement could be used with two arrays of glass solar collector tubes.

Figure 22:
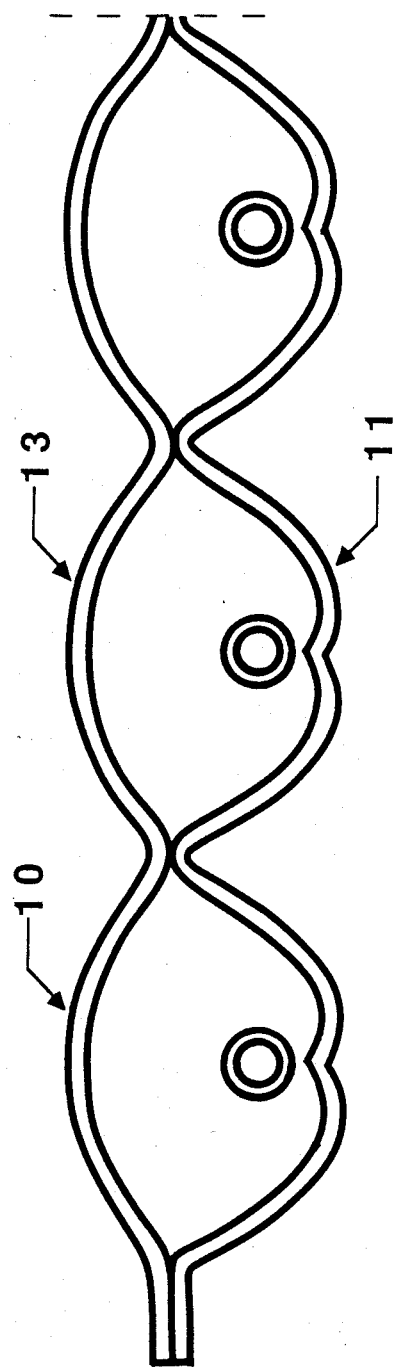
FIG. 22 is a possible partial cross section of the glass solar collector panels of FIGS. 1, 4, 5, 7, 8, 10, or 20 along the direction of line 102 of FIG. 1.

FIG. 22 shows a possible partial cross section of a glass solar collector panel 10 along the direction such as that of line 101 of FIG. 1, so as to indicate a possible window and concentration shape of the upper glass sheet 13 and lower glass sheet 11 which form the glass vacuum envelope of the panel 10.

Figure 23:
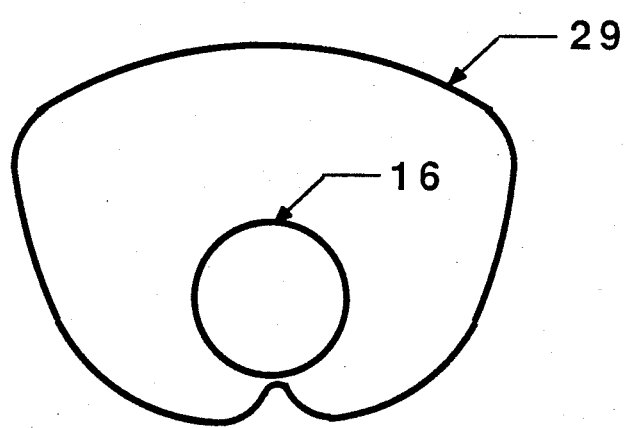
FIG. 23 is a possible cross section of a glass solar collector tube of FIGS. 15 or 18 along the direction of line 102 of FIG. 15 for the embodiment in which the lower part of each tube is shaped and mirrored to concentrate the solar radiation.

FIG. 23 shows a possible cross section of a glass solar collector tube 29 along the direction such as that of line 102 of FIG. 15 to indicate a possible window and concentration shape of the glass for the embodiment where the lower part of the glass solar collector tube 29 is shaped and mirrored to concentrate solar radiation.

Figure 24:
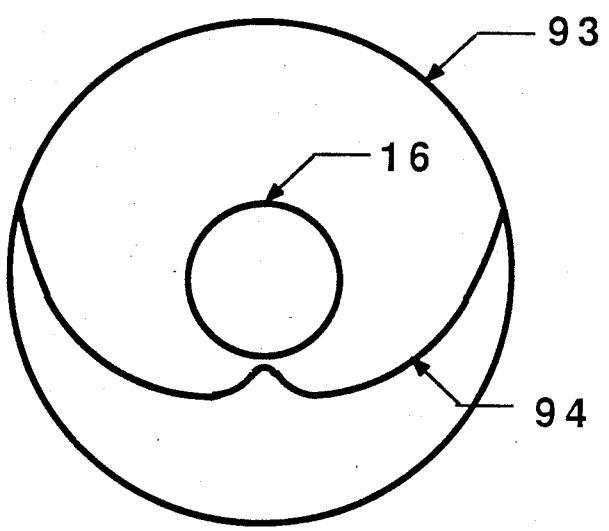
FIG. 24 is a cross section of a glass solar collector tube similar to those of FIG. 15 or 18 along the direction of line 102 of FIG. 15 for the embodiment in which the glass vacuum envelope of each tube is circular and concentric with the glass absorbing tube, and a metal foil mirror is inserted in the tube to concentrate the solar radiation.

FIG. 24 shows the circular shape of a glass solar collector tube 93 and possible shape of the internal metal foil mirror 94 for the embodiment where a separate metal foil mirror is used to concentrate the solar radiation inside the vacuum.

In the figures, no evacuation and gettering stems, drain or fill tubes, or other finer details of the design have been shown, in order to simplify the figures, without lessening the clarity of presentation of the inventive concept.

The dimensions of the glass solar collector panel or array of glass solar collector tubes used for the solar thermal collector system of this invention are determined partly by ease of handling of these panels and tubes. The decision on heat storage tank size is affected by the length of the panel or tubes, and vice versa. The tubular heat pipes are limited in length by the amount of heat they can transfer. This length can be determined using knowledge found in the prior art. It is anticipated that panel or arrays of tubes with a length along the heat pipes of about 2 to 4 meters and a transverse width of about one meter or less will be appropriate. The heat storage tank diameter will be determined by the length of time stored heat may be used with little of no collection of solar energy and by the collecting length of the panels or arrays of tubes. The amount of solar energy collected per square meter of collection area per day will average approximately in the range of 7–14 megajoules, depending upon the collection site and time of year.

Although approximate properties and dimensions of the solar thermal collector system of this invention have been specified, along with some materials to be used, we do not deem the invention discussed to be limited to such materials and dimensions, except as claimed below. Deviations and logical extensions of the invention presented here are to be considered within the scope of this invention.

The concept of this invention includes various alternative structures to the various elements within the device. Specifically, the structure and material of the heat pipes, whether a glass solar collector panel or array of glass solar collector tubes is to be used for the evacuated glass solar collector, and the method of regulating the maximum heat storage tank temperature, are examples which have been cited with various alternative structures. Each of these alternative structural elements should be considered to be alternative structures of each of the other alternative structures of each of the other elements. Accordingly, the scope of this disclosure specifically includes and relates to each of the possible alternatives.

It is understood that the description herein of my invention is done to fully comply with the requirements of 35 USC 112, and does not intend to limit the invention in any way, thus varying forms of the herein described invention are considered to be within the scope of the present invention.

What is claimed is:

1. A solar thermal collector system, one of a class of devices which converts solar radiation into heat and transmits this heat to storage from whence it is utilized, comprising:

an evacuated glass solar collector, the evacuated glass solar collector having a glass vacuum envelope, the upper portion of the glass vacuum envelope also serving as window to pass solar radiation, the evacuated glass solar collector having a multiplicity of substantially parallel linear adjacent concentrating troughs, each trough shaped and mirror surfaced so as concentrate solar radiation in the vacuum, the mirror surface inside the vacuum and the concentration approximately ideal, the multiplicity of substantially parallel linear adjacent troughs extending substantially over the entire length and width of the evacuated glass solar collector, the upper portion of the glass vacuum envelope joined to the lower portion of the glass vacuum envelope between each trough substantially along the entire length of each trough, the upper portion of the glass vacuum envelope joined to the lower portion to the glass vacuum envelope around the outer perimeter of the evacuated glass solar collector so as to provide a glass vacuum seal, the evacuated glass solar collector having a multiplicity of glass absorbing tubes, each glass absorbing tube coated with selective absorber, each glass absorbing tube positioned in vacuum in corresponding substantially parallel linear adjacent trough, and extending substantially along the entire length of the trough, so as to receive the concentrated solar radiation, each glass absorbing tube having one end closed inside the vacuum near one end of the corresponding trough, each glass absorbing tube having glass vacuum seal at the other end near the opposing end of the corresponding substantially parallel linear adjacent trough, each glass absorbing tube having means of heat pipe removal of the collected heat through the glass vacuum sealed end, the glass of the evacuated glass solar collector being like glass;

a heat storage system, the heat storage system adjacent to the evacuated glass solar collector, the heat storage system having a heat storage tank which is thermally insulated, the heat storage tank containing a heat storage medium, and the heat storage system including means of removal of heat from the heat storage tank for utilization; a tubular heat pipe system, the tubular heat pipe system having an evaporator portion, the evaporator portion comprising primarily of a multiplicity of substantially parallel linear adjacent tube members, the evaporator portion inside the glass vacuum envelope so as to receive the heat from the concentrated solar radiation with the substantially parallel linear adjacent tube members in each corresponding substantially parallel linear adjacent trough and extending substantially over the entire length of each trough, the tubular heat pipe system having an adiabatic portion, the adiabatic portion proceeding directly from the evaporator portion to exit from the part of the glass vacuum envelope closest to the heat storage tank, the tubular heat pipe system having a condenser portion, the adiabatic portion proceeding directly from the glass vacuum envelope to the condenser portion, the condenser portion having means of efficient transfer of heat to the heat storage tank and heat storage medium, the tubular heat pipe system suitable for passing vapors from the evaporator portion to the condenser portion, and return of condensed vapors from the condenser portion to the evaporator portion, but substantially limiting the passing of condensed vapors from the evaporator portion to the condenser portion; and with the solar thermal collector system having means of limiting the maximum temperature reached by the heat storage tank.

2. The invention of claim 1 wherein:

the evacuated glass solar collector is one or more glass solar collector panels, each glass solar collector panel having a pre-formed lower glass sheet, the pre-formed lower glass sheet formed into a plurality of the substantially parallel linear troughs, a corresponding plurality of the glass absorbing tubes positioned in the plurality of troughs to receive the concentrated solar radiation, each glass absorbing tube having an opening at one end, the opening outside the vacuum, each glass absorbing tube sealed to the lower glass sheet at the end with the opening, each glass solar collector panel having a pre-formed upper glass sheet, the pre-formed upper glass sheet sealed to the pre-formed lower glass sheet, the pre-formed upper glass sheet substantially transparent to solar radiation, the upper glass sheets and the lower glass sheets of the one or more glass solar collector panels comprising the glass vacuum envelope of the evacuated glass solar collector, the plurality of glass absorbing tubes and plurality of troughs of the one or more glass solar collector panels comprising the multiplicity of glass absorbing tubes and multiplicity of troughs of the evacuated glass solar collector, and wherein;

the tubular heat pipe system comprises a multiplicity of metal heat pipes, each metal heat pipe having an evaporator section, each evaporator section inserted into the opening at the end of one of the corresponding multiplicity of glass absorbing tubes so as to substantially fill the glass absorbing tube, each metal heat pipe having an adiabatic section, each adiabatic section proceeding directly from the evaporator section to exit from the glass absorbing tube through the opening, each metal heat pipe having a condenser section, the adiabatic section proceeding from the opening directly to the condenser section, the condenser section having means of efficient transfer of heat to the heat storage tank and heat storage medium, the multiplicity of evaporator sections comprising the evaporator portion of the tubular heat pipe system, the multiplicity of adiabatic sections comprisng the adiabatic portion of the tubular heat pipe system, and the multiplicity of condenser sections comprising the condenser portion of the tubular heat pipe system.

3. The invention of claim 1 wherein:

the evacuated glass solar collector is one or more glass solar collector panels, each glass solar collector panel having a pre-formed lower glass sheet, the pre-formed lower glass sheet formed into a plurality of the substantially parallel linear troughs, a corresponding plurality of the glass absorbing tubes positioned in the plurality of troughs to receive the concentrated solar radiation, each glass solar collector panel having a pre-formed upper glass sheet, the pre-formed upper glass sheet sealed to the pre-formed lower glass sheet, the pre-formed upper glass sheet substantially transparent to solar radiation, the upper glass sheets and the lower glass sheets of the one or more glass solar collector panels comprising the glass vacuum envelope of the evacuated glass solar collector, the plurality of glass absorbing tubes and plurality of troughs of the one or more glass solar collector panels comprising the multiplicity of glass absorbing tubes and multiplicity of troughs of the evacuated glass solar collector, and wherein;

the tubular heat pipe system comprises a multiplicity of glass heat pipes, each glass heat pipe having an evaporator section, each of the multiplicity of glass absorbing tubes also serving as the evaporator section of one of the corresponding multiplicity of glass heat pipes, each glass heat pipe having an adiabatic section, the adiabatic section proceeding from the evaporator section to exit from the glass vacuum envelope and vacuum sealed thereto, each glass heat pipe having a condenser section, each adiabatic section proceeding from the glass vacuum envelope to the condenser section, the condenser section having means of efficient transfer of heat to the heat storage tank and heat storage medium, the multiplicity of evaporator sections comprising the evaporator portion of the tubular heat pipe system, the multiplicity of adiabatic sections comprising the adiabatic portion of the tubular heat pipe system, and the multiplicity of condenser sections comprising the condenser portion of the tubular heat pipe system.

4. The invention of claim 1 wherein:

the evacuated glass solar collector is one or more glass solar collector panels, each glass solar collector panel having a pre-formed lower glass sheet, the pre-formed lower glass sheet formed into a plurality of the substantially parallel linear troughs, the plurality of substantially parallel linear troughs terminating at one end in a cross manifold concentrating trough, a corresponding plurality of the glass absorbing tubes positioned separately in the plurality of substantially parallel linear troughs to receive the concentrated solar radiation, each glass solar collector panel having a cross manifold absorbing tube coated with selective absorber, the cross manifold absorbing tube positioned in the cross manifold concentrating trough to receive the concentrated radiation, the plurality of glass absorbing tubes joined to the cross manifold absorbing tube, each glass solar collector panel having a pre-formed upper glass sheet, the pre-formed upper glass substantially transparent to solar radiation, the pre-formed upper glass sheet sealed to the pre-formed lower glass sheet, the pre-formed upper glass sheets and the pre-formed lower glass sheets of the one or more glass solar collector panels comprising the glass vacuum envelope of the evacuated glass solar collector, the plurality of glass absorbing tubes and plurality of troughs of the one or more glass solar collector panels comprising the multiplicity of glass absorbing tubes and multiplicity of troughs of the evacuated glass solar collector, and wherein;

the tubular heat pipe system comprises one or more glass heat pipes, each glass heat pipe having an evaporator part, each of the plurality of glass absorbing tubes and cross manifold absorbing tube of one glass solar collector panel also serving as the evaporator part of one of the one or more glass heat pipes, each glass heat pipe having an adiabatic part, the adiabatic part proceeding from the evaporator part to exit from the glass vacuum envelope and vacuum sealed thereto, each glass heat pipe having a condenser part, each adiabatic part proceeding from the vacuum envelope to the condenser part, the condenser part having means of efficient transfer of heat to the heat storage tank and heat storage medium, the evaporator parts of the glass heat pipes of the one or more glass solar collector panels comprising the evaporator portion of the tubular heat pipe system, the adiabatic parts of the glass heat pipes of the one or more glass solar collector panels comprising the adiabatic portion of the tubular heat pipe system, and the condenser parts of the glass heat pipes of the one or more glass solar collector panels comprising the condenser portion of the tubular heat pipe system.

5. The invention of claim 1 wherein;

the evacuated glass solar collector is a multiplicity of substantially parallel linear glass solar collector tubes, each substantially parallel linear glass solar collector tube having a lower part, the lower part shaped and mirrored so as to serve as one of the multiplicity of substantially parallel linear troughs for concentrating solar radiation with one of the multiplicity of glass absorbing tubes positioned therein to receive concentrated solar radiation, each substantially parallel linear glass solar collector tube having an upper part, the upper part substantially transparent to solar radiation, the lower part and upper part of each glass solar collector tube forming a glass vacuum envelope for that glass solar collector tube, each of the glass absorbing tubes having an opening at one end, the opening outside the vacuum, the end of each glass absorbing tube with opening sealed to the glass vacuum envelope of the corresponding glass solar collector tube at one end, the multiplicity of glass vacuum envelopes of the multiplicity of glass solar collector tubes forming the glass vacuum envelope of the evacuated glass solar collector, and wherein;

the tubular heat pipe system comprises a multiplicity of metal heat pipes, each metal heat pipe having an evaporator section, each evaporator section inserted into the opening at the end of one of the corresponding multiplicity of glass absorbing tubes so as to substantially fill the glass absorbing tube, each metal heat pipe having an adiabatic section, each adiabatic section proceeding directly from the evaporator section to exit from the glass absorbing tube through the opening, each metal heat pipe having a condenser section, the adiabatic section proceeding from the opening directly to the condenser section, the condenser section having means of efficient transfer of heat to the heat storage tank and heat storage medium, the multiplicity of evaporator sections comprising the evaporator portion of the tubular heat pipe system, the multiplicity of adiabatic sections comprising the adiabatic portion of the tubular heat pipe system, and the multiplicity of condenser sections comprising the condenser portion of the tubular heat pipe system.

6. The invention of claim 1 wherein;
the evacuated glass solar collector is a multiplicity of substantially parallel linear glass solar collector tubes, each substantially parallel linear glass solar collector tube having a lower part, the lower part shaped and mirrored so as to serve as one of the multiplicity of substantially parallel linear troughs for concentrating solar radiation with one of the multiplicity of glass absorbing tubes positioned therein to receive concentrated solar radiation, each substantially parallel linear glass solar collector tube having an upper part, the upper part substantially transparent to solar radiation, the lower part and upper part of each glass solar collector tube forming a glass vacuum envelope for that glass solar collector tube, the multiplicity of glass vacuum envelopes of the multiplicity of glass solar collector tubes forming the glass vacuum envelope of the evacuated glass solar collector, and wherein;
the tubular heat pipe system comprises a multiplicity of glass heat pipes, each glass heat pipe having an evaporator section, each of the multiplicity of glass absorbing tubes also serving as the evaporator section of one of the corresponding multiplicity of glass heat pipes, each glass heat pipe having an adiabatic section, the adiabatic section proceeding from the evaporator section to exist from one end of the glass vacuum envelope of the glass solar collector tube and vacuum sealed thereto, each glass heat pipe having a condenser section, each adiabatic section proceeding from the glass vacuum envelope to the condenser section, the condenser section having means of efficient transfer of heat to the heat storage tank and heat storage medium, the multiplicity of evaporator sections comprising the evaporator portion of the tubular heat pipe system, the multiplicity of adiabatic sections comprising the adiabatic portion of the tubular heat pipe system, and the multiplicity of condenser sections comprising the condenser portion of the tubular heat pipe system.

7. The invention of claim 1 wherein;
the evacuated glass solar collector is a multiplicity of substantially parallel linear glass solar collector tubes, each substantially parallel linear glass solar collector tube having a circular cross section glass vacuum envelope tube, each glass solar collector tube having inside corresponding circular cross section glass vacuum envelope tube one of the multiplicity of glass absorbing tubes, the circular cross section glass vacuum envelope tube concentric with the corresponding glass absorbing tube, each glass solar collector tube having inside corresponding circular glass vacuum envelope tube one of the multiplicity of substantially parallel linear troughs, each substantially parallel linear trough formed of reflecting metal foil, the corresponding metal foil trough positioned inside corresponding circular glass vacuum envelope tube so as to concentrate solar radiation onto corresponding glass absorbing tube, each circular cross section glass vacuum envelope tube substantially transparent to solar radiation, each of the glass absorbing tubes having an opening at one end, the opening outside the vacuum, the end of each glass absorbing tube with opening sealed to one end of the circular cross section glass vacuum envelope of the corresponding glass solar collector tube, the multiplicity of circular cross section glass vacuum envelope tubes of the multiplicity of glass solar collector tubes forming the vacuum envelope of the evacuated glass solar collector, and wherein;
the tubular heat pipe system comprises a multiplicity of metal heat pipes, each metal heat pipe having an evaporator section, each evaporator section inserted into the opening at the end of one of the corresponding multiplicity of glass absorbing tubes so as to substantially fill the glass absorbing tube, each metal heat pipe having an adiabatic section, each adiabatic section proceeding directly from the evaporator section to exit from the glass absorbing tube through the opening, each metal heat pipe having a condenser section, the adiabatic section proceeding from the opening directly to the condenser section, the condenser section having means of efficient transfer of heat to the heat storage tank and heat storage medium, the multiplicity of evaporator sections comprising the evaporator portion of the tubular heat pipe system, the multiplicity of adiabatic sections comprising the adiabatic portion of the tubular heat pipe system, and the multiplicity of condenser sections comprising the condenser portion of the tubular heat pipe system.

8. The invention of claim 1 wherein;
the evacuated glass solar collector is a multiplicity of substantially parallel linear glass solar collector tubes, each substantially parallel linear glass solar collector tube having a circular cross section glass vacuum envelope tube, each glass solar collector tube having inside corresponding circular cross section glass vacuum envelope tube one of the multiplicity of glass absorber tubes, the circular cross section glass vacuum envelope tube concentric with corresponding glass absorbing tube, each glass solar collector tube having inside corresponding circular cross section glass vacuum envelope tube one of the multiplicity of substantially parallel linear troughs, each substantially parallel linear trough formed of reflecting metal foil, the corresponding metal foil trough positioned inside corresponding circular cross section glass vacuum envelope tube so as to concentrate solar radiation onto corresponding glass absorbing tube, each circular cross section glass vacuum envelope tube substantially transparent to solar radiation, the multiplicity of circular cross sectin glass vacuum envelope tubes of the multiplicity of glass solar collector tubes forming the vacuum envelope of the evacuated glass solar collector, and wherein;
the tubular heat pipe system comprises a multiplicity of glass heat pipes, each glass heat pipe having an evaporator section, each of the multiplicity of glass absorbing tubes also serving as the evaporator section of one of the corresponding multiplicity of glass heat pipes, each glass heat pipe having an adiabatic section, the adiabatic section proceeding from the evaporator section to exit from one end of the circular cross section glass vacuum envelope tube of the corresponding glass solar collector tube and vacuum sealed thereto, each glass heat pipe having a condenser section, each adiabatic section proceeding from the circular cross section glass vacuum envelope tube to the condenser section, the condenser section having means of efficient transfer of heat to the heat storage tank and heat storage medium, the multiplicity of evaporator sections comprising the evaporator portion of the tubular heat pipe system, the multiplicity of adiabatic sections comprising the adiabatic portion of the tubular heat pipe system, and the multiplicity of condenser sections comprising the condenser portion of the tubular heat pipe system.

9. The invention of claim 1 wherein the means of limiting the maximum heat storage temperature is a gas loaded variable conductance heat pipe system which can transfer heat collected by the solar thermal collector system to an external surface for dissipation.

10. The invention of claim 1 in which the heat pipes of the tubular heat pipe system are gas loaded variable conductance heat pipes which can transfer heat collected by the solar thermal collector system to an external surface for dissipation so as to limit the maximum storage tank temperature.

11. The invention of claim 1 wherein the heat storage medium is water.

12. The invention of claim 1 wherein the heat storage medium includes a phase change material.

13. The invention of claim 1 wherein the heat storage tank of the solar thermal collector system can be joined with the heat storage tanks of other solar thermal collector systems to form one enlarged heat storage tank, and the corresponding evacuated glass solar collectors can be joined to form an array of evacuated glass collectors of larger area.

14. The invention of claim 1 in which the selective absorber is a photovoltaic material which can convert solar radiation into both heat and electrical energy.

15. A solar thermal collector system, one of a class of devices which converts solar radiation into heat and transmits this heat to storage from whence it is utilized, comprising an evacuated glass solar collector, an insulated heat storage system, with heat storage tank and storage medium, and a pumped fluid circulation system for transferring heat from the evacuated glass solar collector to the heat storage system, with the evacuated glass solar collector formed as an array of glass solar collector panels, each glass solar collector panel comprising:

a lower glass sheet formed as a plurality of substantially parallel linear concentrating surface troughs terminating at each end in respective cross manifold concentrating surface troughs, the lower glass sheet having a mirrored coating;

an upper solar transparent glass sheet sealed to the lower sheet whereby to form an envelope;

an absorbing tube network having a plurality of substantially parallel longitudinal tube members terminating at each end in respective cross manifold tube members, the tube network positioned between the lower glass sheet and the upper glass sheet within the envelope whereby each of the longitudinal tube members are positioned within respective linear concentrating surface troughs and the respective cross manifold tube members are positioned within respective manifold concentrating surface troughs;

the tube network coated with a selective absorbing surface; and the absorbing tube network having an entrance sealably protruding through the envelope from one of the manifold tube members and an exit sealably protruding through the envelope from the opposite manifold tube member and the absorbing tube network being suitable for passing a heatable fluid therethrough;

wherein the improvement comprises:

the lower glass sheet formed into a plurality of substantially parallel linear troughs, each trough shaped and mirrored to concentrate solar radiation in the vacuum, the concentration being approximately ideal;

the absorbing tube network formed as a plurality of substantially parallel linear glass absorbing tubes, each glass absorbing tube positioned in one of the corresponding substantially parallel linear troughs to receive concentrated solar radiation, each glass absorbing tube closed at one end in vacuum, each glass absorbing tube having an opening at the other end, the opening outside the glass vacuum envelope, each glass absorbing tube sealed to the glass vacuum envelope at the end with the opening;

the heat from each glass solar collector panel transferred directly to the insulated heat storage system by a plurality of metal heat pipes, each heat pipe having an evaporator section, the evaporator section of each metal heat pipe inserted into the opening at the end of one of the corresponding plurality of glass absorbing tubes so as to substantially fill the glass absorbing tube, each metal heat pipe having an adiabatic section, the adiabatic section proceeding from the evaporator section to exit from corresponding glass absorbing tube through the opening, each metal heat pipe having a condenser section, each adiabatic section proceeding directly from the opening to the condenser section, each condenser section in good thermal contact with the heat storage tank so as to provide efficient transfer of heat from each glass absorbing tube to the insulated heat storage system, each metal heat pipe suitable for efficiently passing vapors from the evaporator section to the condenser section, and return of condensed vapors from the condenser section to the evaporator section, but substantially limiting the passing of condensed vapors from the evaporator section to the condenser section; and each glass solar collector panel with plurality of glass absorbing tubes formed of like glass.

16. A solar thermal collector system, one of a class of devices which converts solar radiation into heat and transmits this heat to storage from whence it is utilized, comprising an evacuated glass solar collector, a thermally insulated heat storage system, with heat storage tank containing a heat storage medium, and a thermally insulated pumped fluid circulation system for transferring heat from the evacuated glass solar collector to the heat storage system, with the evacuated glass solar collector formed as an array of glass solar collector panels, each glass solar collector panel comprising:

a lower glass sheet formed as a plurality of substantially parallel linear concentrating surface troughs terminating at each end in respective cross manifold concentrating surface troughs, the lower sheet having a mirrored coating;

an upper solar transparent glass sheet sealed to the lower sheet whereby to form a glass vacuum envelope;

an absorbing tube network having a plurality of substantially parallel longitudinal tube members terminating at each end in respective cross manifold tube members, the tube network positioned between the lower glass sheet and the upper glass sheet within the envelope whereby each of the longitudinal tube members are positioned within respective linear concentrating surface troughs and the respective cross manifold tube members are positioned within respective manifold concentrating surface troughs;
the tube network coated with a selective absorbing surface; and
the absorbing tube network having an entrance sealably protruding through the envelope from one of the manifold tube members and an exit sealably protruding through the envelope from the opposite manifold tube member and the absorbing tube network being suitable for passing a heatable fluid therethrough;
wherein the improvement comprises:
the lower glass sheet formed into a plurality of substantially parallel linear troughs, each trough shaped and mirrored to concentrate solar radiation in the vacuum, the concentration being approximately ideal;
the absorbing tube network formed as a plurality of substantially parallel linear glass absorbing tubes, each glass absorbing tube positioned in one of the corresponding substantially parallel linear troughs to receive concentrated solar radiation, each glass absorbing tube closed at one end in vacuum;
the heat from each glass solar collector panel transferred directly to the insulated heat storage system by a plurality of glass heat pipes, each glass heat pipe having a evaporator section, one of the glass absorbing tubes of the corresponding plurality of glass absorbing tubes forming the evaporator section of each glass heat pipe, each glass heat pipe having an adiabatic section, the adiabatic section proceeding from the evaporator section to exit from the glass vacuum envelope and sealed thereto, each glass heat pipe having a condenser section, each adiabatic section proceeding directly from the glass vacuum envelope to the condenser section, each condenser section in good thermal contact with the heat storage tank and heat storage medium so as to provide efficient transfer of heat from, each glass absorbing tube to the insulated heat storage system, each metal heat pipe suitable for efficiently passing vapors from the evaporator section to the condenser section, and return of condensed vapors from the condenser section to the evaporator section, but substantially limiting the passing of condensed vapors from the evaporator section to the condenser section; and
each glass solar collector panel with plurality of glass absorbing tubes formed of like glass.

17. A solar thermal collector system comprising an evacuated glass solar collector, a heat storage system with a heat storage tank containing a heat storage medium, and a means of transfering heat from the evacuated glass solar collector to the heat storage tank and heat storage medium, with the evacuated glass solar collector formed as an array from a multiplicity of solar collector tubes, each solar collector tube comprising:
a linear evacuated glass tube, the linear evacuated glass tube having a lower section, the lower section shaped in the form of a concentrating trough to concentrate solar radiation in vacuum and coated with mirror, and the linear evacuated glass tube having an upper section substantially transparent to solar radiation;
an absorbing tube coated with selective absorber, the absorbing tube positioned in vacuum in the concentrating trough to receive the concentrated solar radiation, the absorbing tube suitable for passing a heatable fluid therethrough, the heatable fluid having suitable means of entrance and exit from the linear evacuated glass tube;
wherein the improvement comprises:
a glass tubular heat pipe system, the glass tubular heat pipe system comprising a corresponding multiplicity of substantially parallel linear heat pipes, each substantially parallel linear heat pipe having an evaporator part, the evaporator part serving as the absorbing tube in the concentrating trough of each corresponding linear evacuated glass tube, each substantially parallel linear heat pipe having an adiabatic part, the adiabatic part connected to the evaporator part and proceeding to exit from one end of the respective linear evacuated glass tube and sealably attached thereto, each substantially parallel linear heat pipe having a condenser part, the adiabatic part proceeding from the respective linear evacuated glass tube directly to the condenser part, the condenser part in good thermal contact with the heat storage tank and heat storage medium, each substantially parallel linear heat pipe and linear evacuated glass tube forming a solar collector tube, the glass tubular heat pipe system providing efficient heat transfer from the solar collector tube to the heat storage system while substantially limiting the transfer of heat from the heat storage system to the solar collector tube, the evacuated glass collector tubes and the glass tubular heat pipe system being formed of like glass; and
a means of limiting the maximum temperature of the heat storage tank and heat storage medium.

18. A solar thermal collector system comprising an evacuated glass solar collector, a heat storage system with a heat storage tank containing a heat storage medium, and a means of transfering heat from the evacuated glass solar collector to the heat storage tank and heat storage medium, with the evacuated glass solar collector formed as an array from a multiplicity of solar collector tubes, each solar collector tube comprising:
a linear evacuated glass tube, the linear evacuated glass tube having a lower section, the lower section shaped in the form of a concentrating trough to concentrate solar radiation in vacuum and coated with mirror, and the linear evacuated glass tube having an upper section substantially transparent to solar radiation;
an absorbing tube coated with selective absorber, the absorbing tube positioned in vacuum in the concentrating trough to receive the concentrated solar radiation, the absorbing tube suitable for passing a heatable fluid therethrough, the heatable fluid having suitable means of entrance and exit from the linear evacuated glass tube;
wherein the improvement comprises:
each absorbing tube formed of glass, each glass absorbing tube closed at one end inside the vacuum, each glass absorbing tube open at the other end outside the vacuum, the open end of each glass absorbing tube sealed to corresponding end of the linear evacuated glass tube;

a metal tubular heat pipe system, the metal tubular heat pipe system comprising a corresponding multiplicity of substantially parallel linear metal heat pipes, each substantially parallel linear heat pipe having an evaporator part, the evaporator part substantially filling the corresponding glass absorbing tube in the concentrating trough of each corresponding linear evacuated glass tube, each substantially parallel linear heat pipe having an adiabatic part, the adiabatic part connected to the evaporator part and proceeding to exit from one end of the corresponding linear evacuated glass tube through the open end of the corresponding glass absorbing tube, each substantially parallel linear heat pipe having a condenser part, the adiabatic part proceeding from the corresponding linear evacuated glass tube directly to the condenser part, the condenser part in good thermal contact with the heat storage tank and the heat storage medium;

the metal tubular heat pipe system providing efficient heat transfer from the solar collector tube to the heat storage system while substantially limiting the transfer of heat from the heat storage system to the solar collector tube; and a means of limiting the maximum temperature of the heat storage tank and heat storage medium.

* * * * *